Dec. 9, 1941.  S. N. WIGHT  2,265,257
INTERLOCKING SYSTEM FOR RAILROADS
Filed March 20, 1936  14 Sheets-Sheet 1

INVENTOR
S. N. Wight,
BY Neil W. Preston,
his ATTORNEY

Dec. 9, 1941.   S. N. WIGHT   2,265,257
INTERLOCKING SYSTEM FOR RAILROADS
Filed March 20, 1936   14 Sheets-Sheet 2

INVENTOR
S. N. Wight,
BY Neil W. Preston,
his ATTORNEY

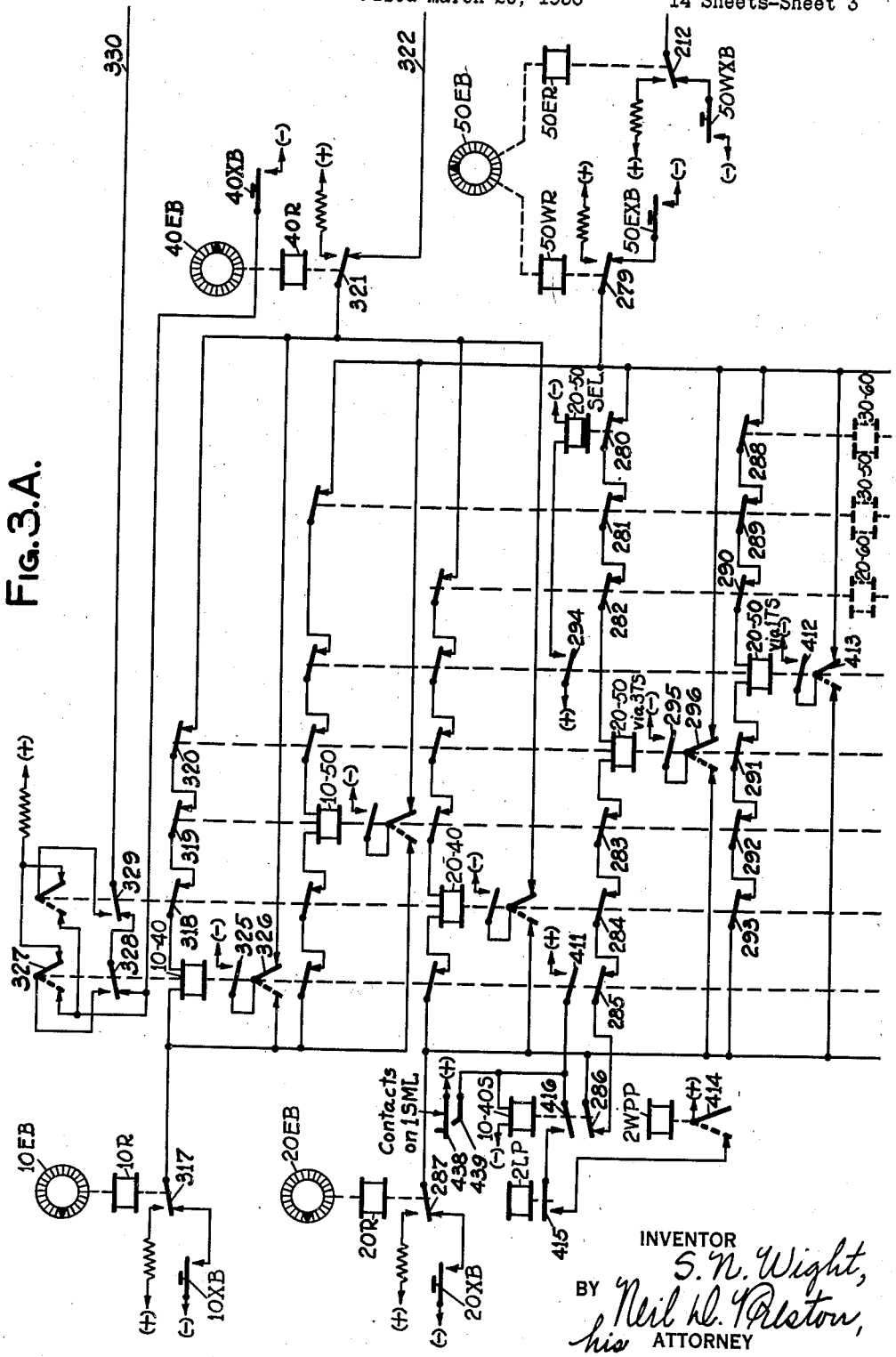

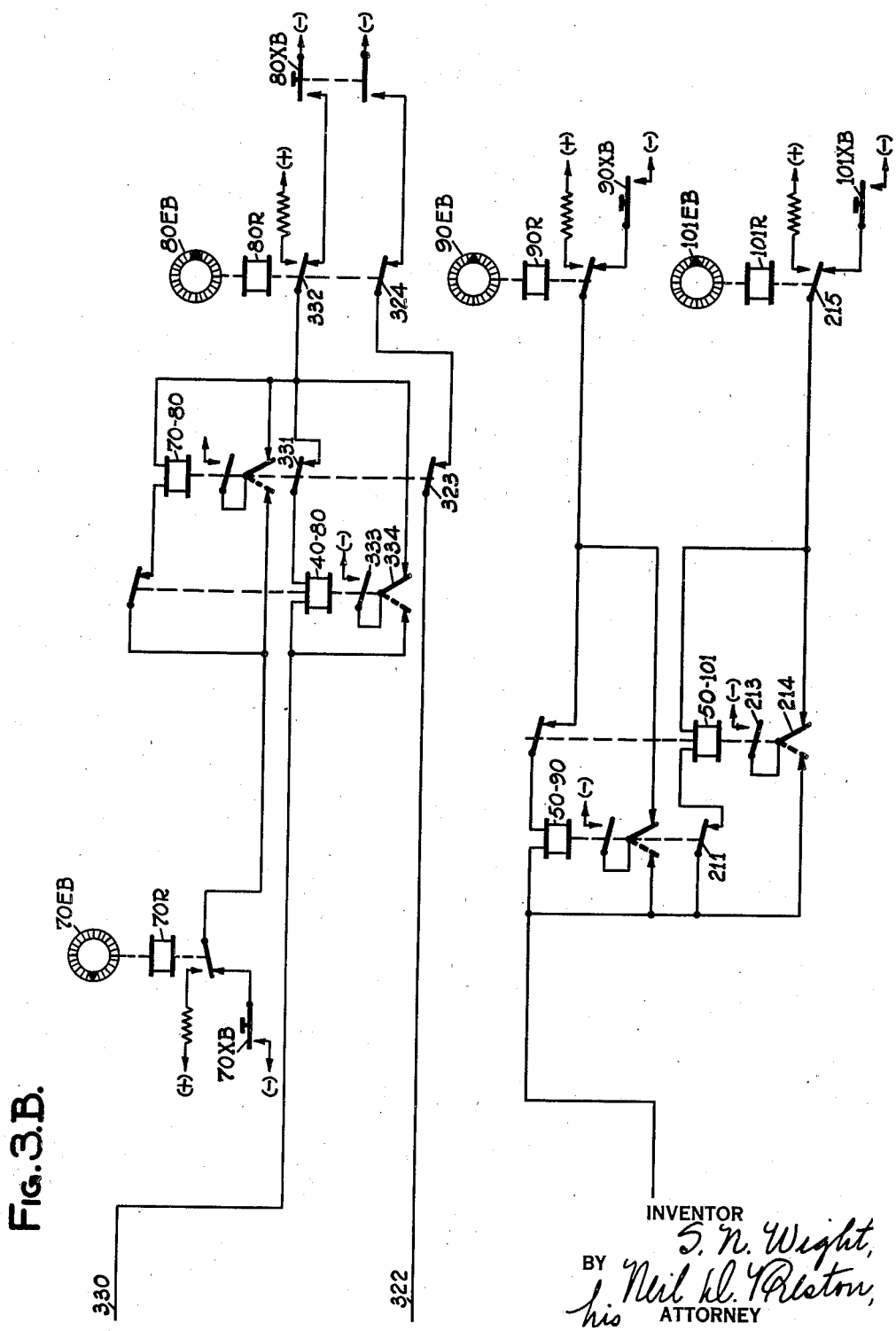

Dec. 9, 1941.　　　S. N. WIGHT　　　2,265,257
INTERLOCKING SYSTEM FOR RAILROADS
Filed March 20, 1936　　14 Sheets-Sheet 5
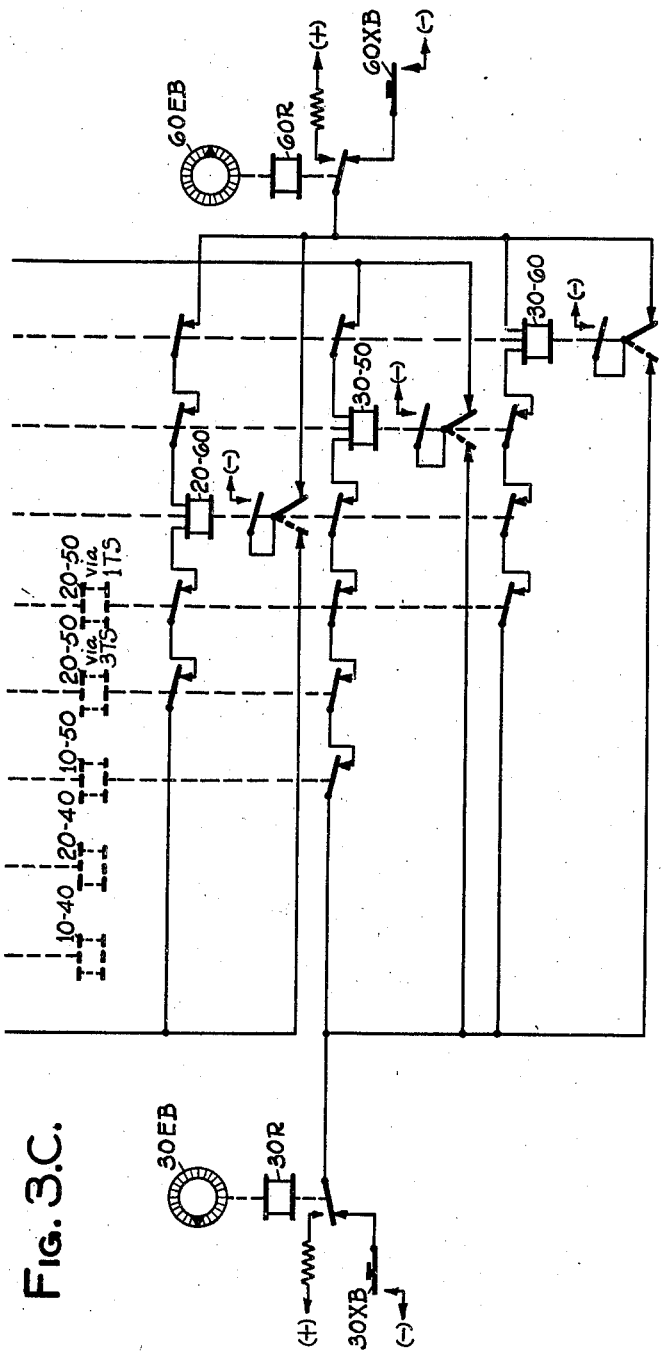
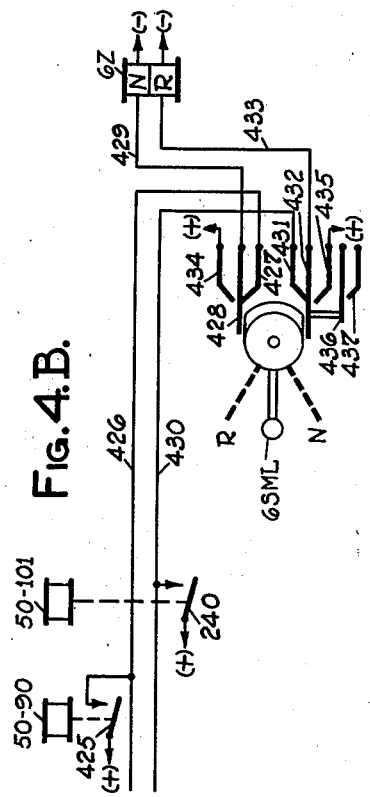
INVENTOR
S. N. Wight,
BY Neil W. Preston,
his ATTORNEY Dec. 9, 1941. S. N. WIGHT 2,265,257
INTERLOCKING SYSTEM FOR RAILROADS
Filed March 20, 1936 14 Sheets-Sheet 6
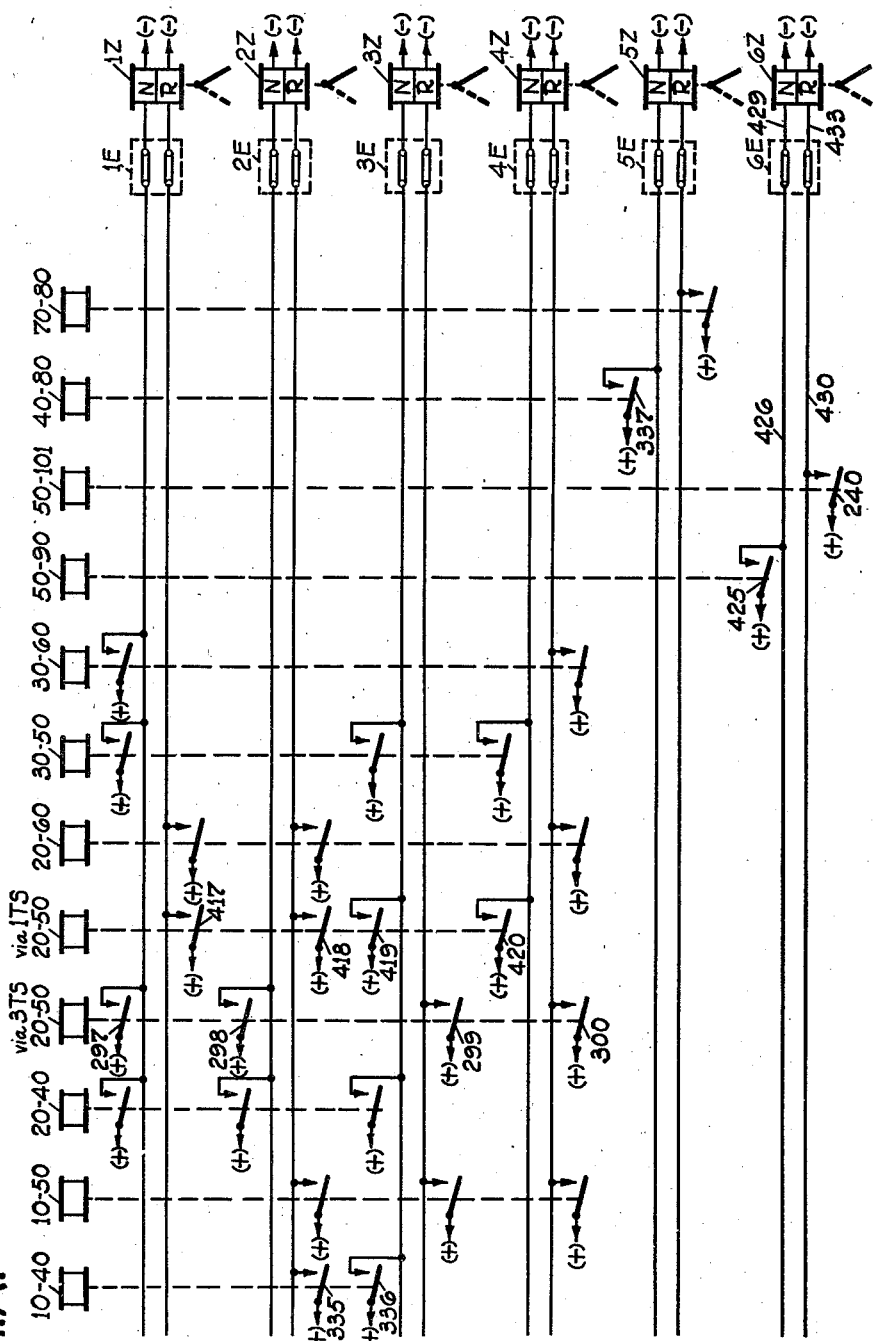
Fig. 4.A.
INVENTOR
S. N. Wight.
BY Neil W. Alston,
his ATTORNEY

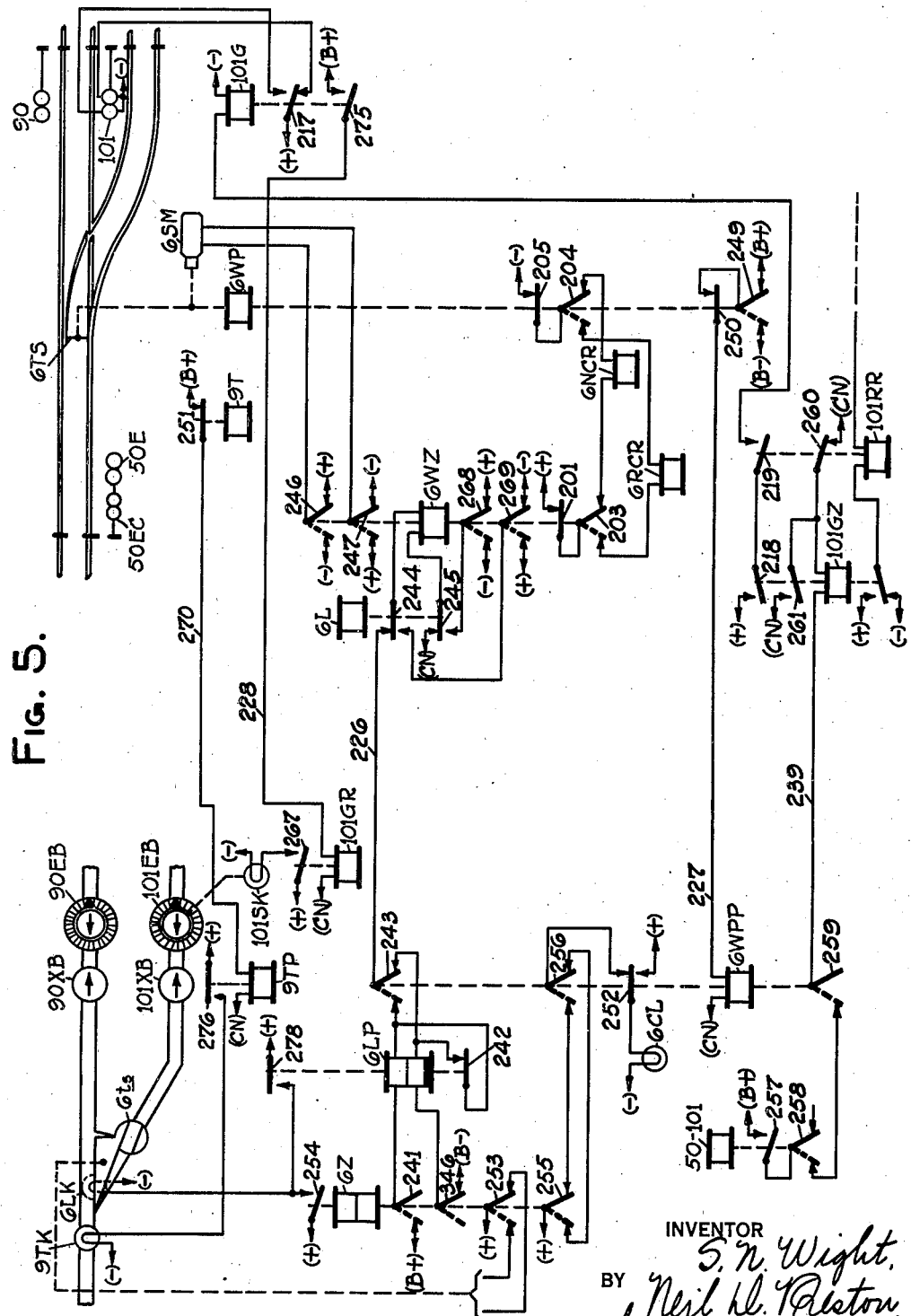

Dec. 9, 1941.                S. N. WIGHT                2,265,257
             INTERLOCKING SYSTEM FOR RAILROADS
                    Filed March 20, 1936         14 Sheets-Sheet 9

INVENTOR
S. N. Wight,
BY Neil W. Preston,
his ATTORNEY

FIG. 7A.

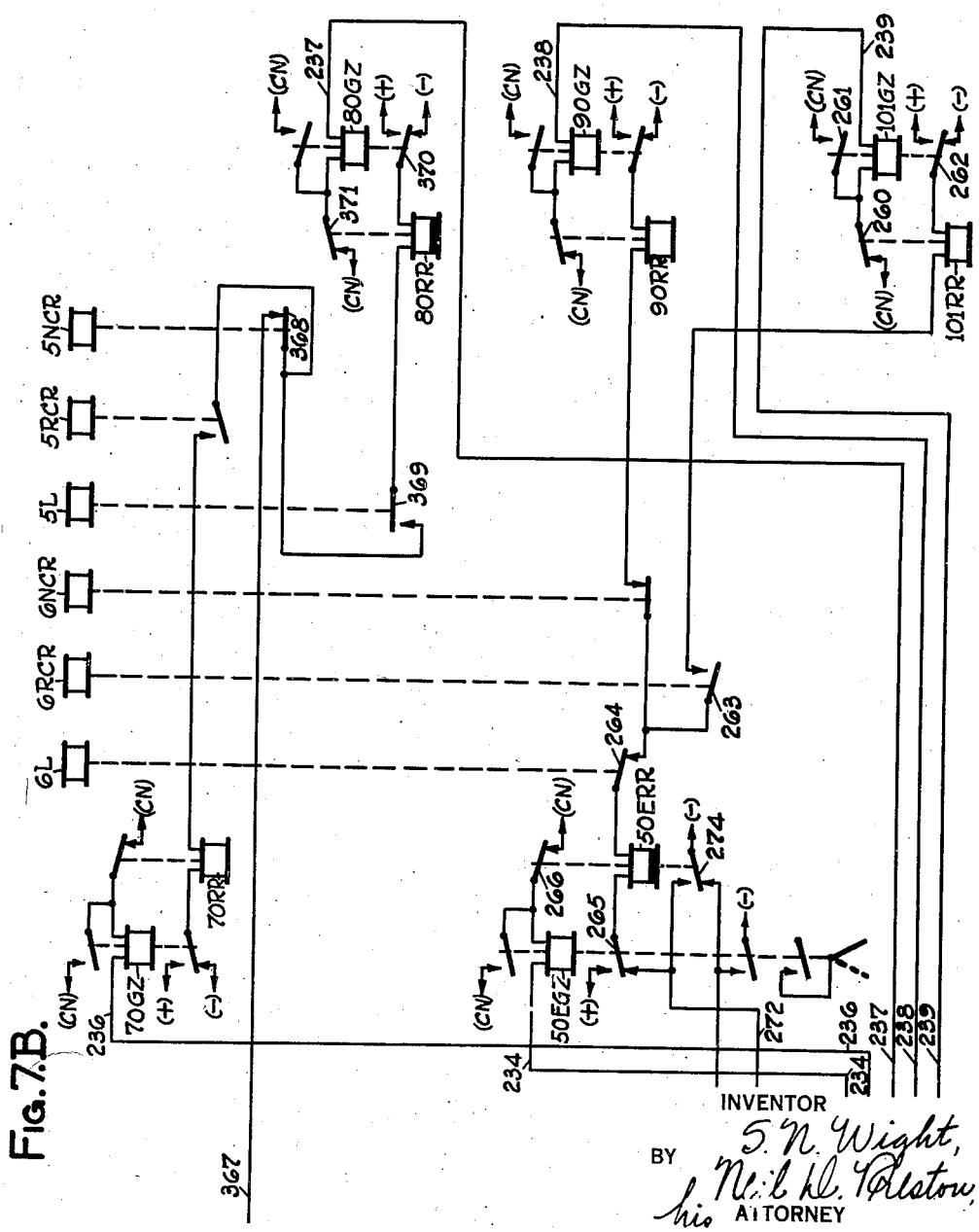

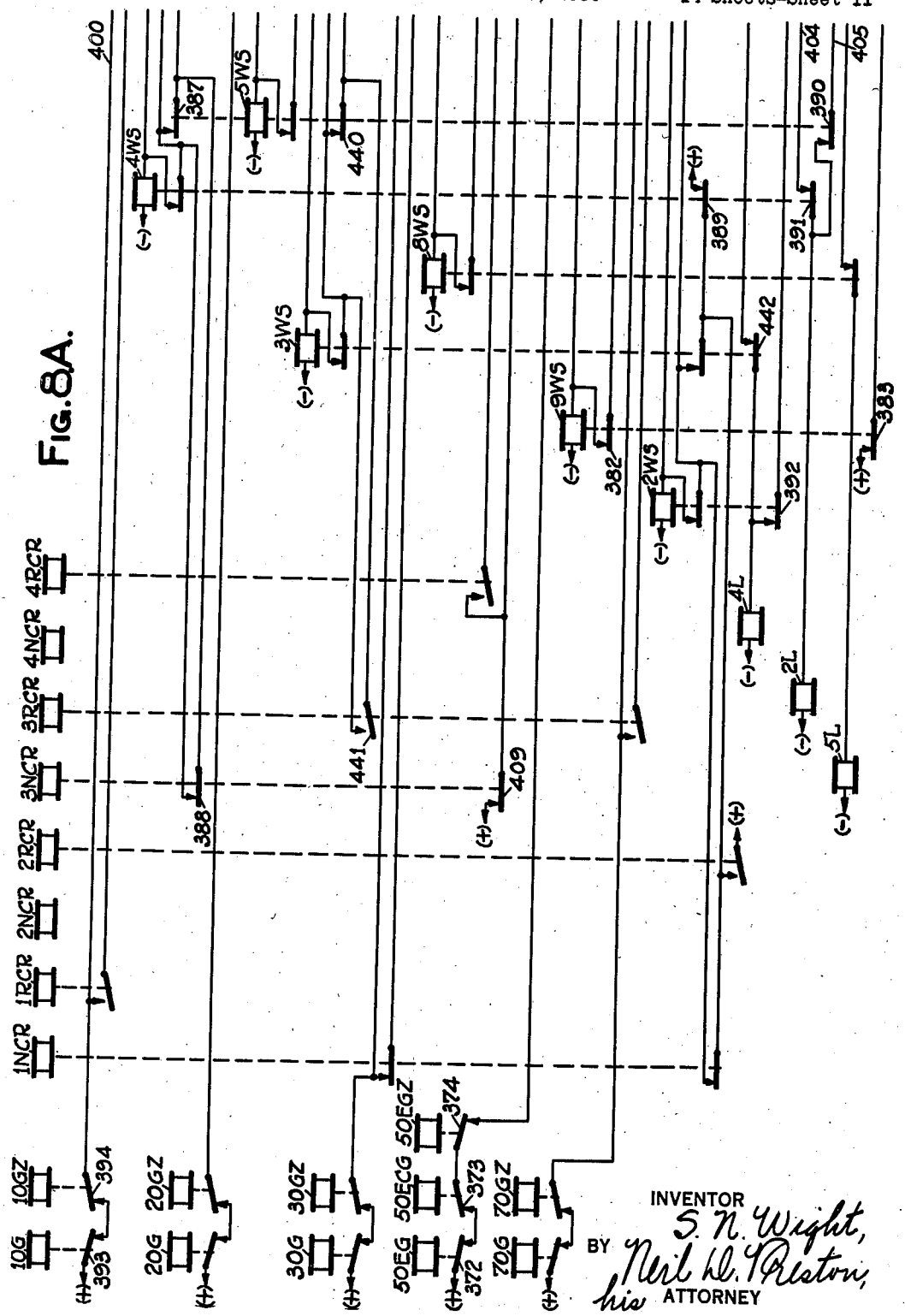

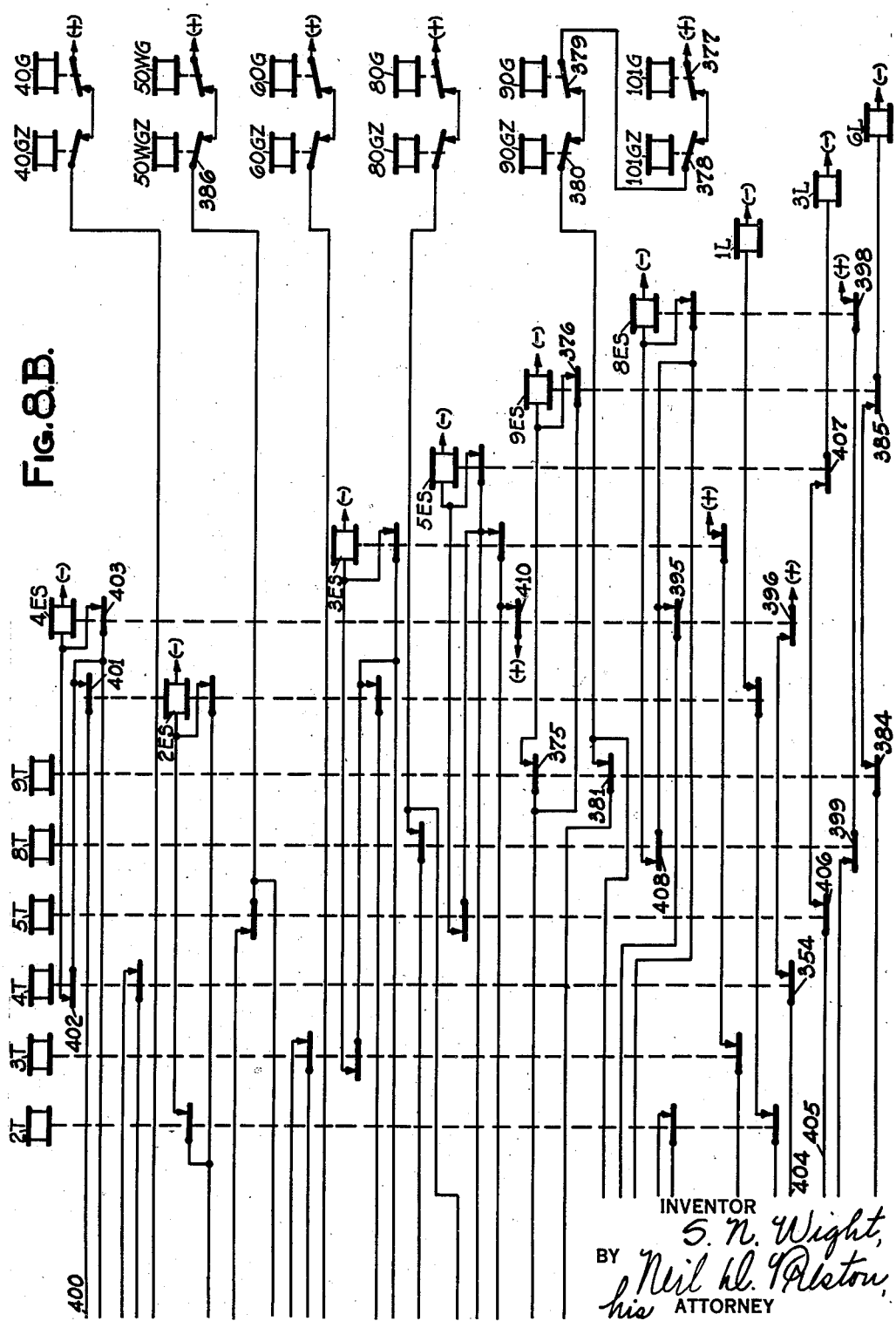

Dec. 9, 1941.  S. N. WIGHT  2,265,257
INTERLOCKING SYSTEM FOR RAILROADS
Filed March 20, 1936    14 Sheets-Sheet 13
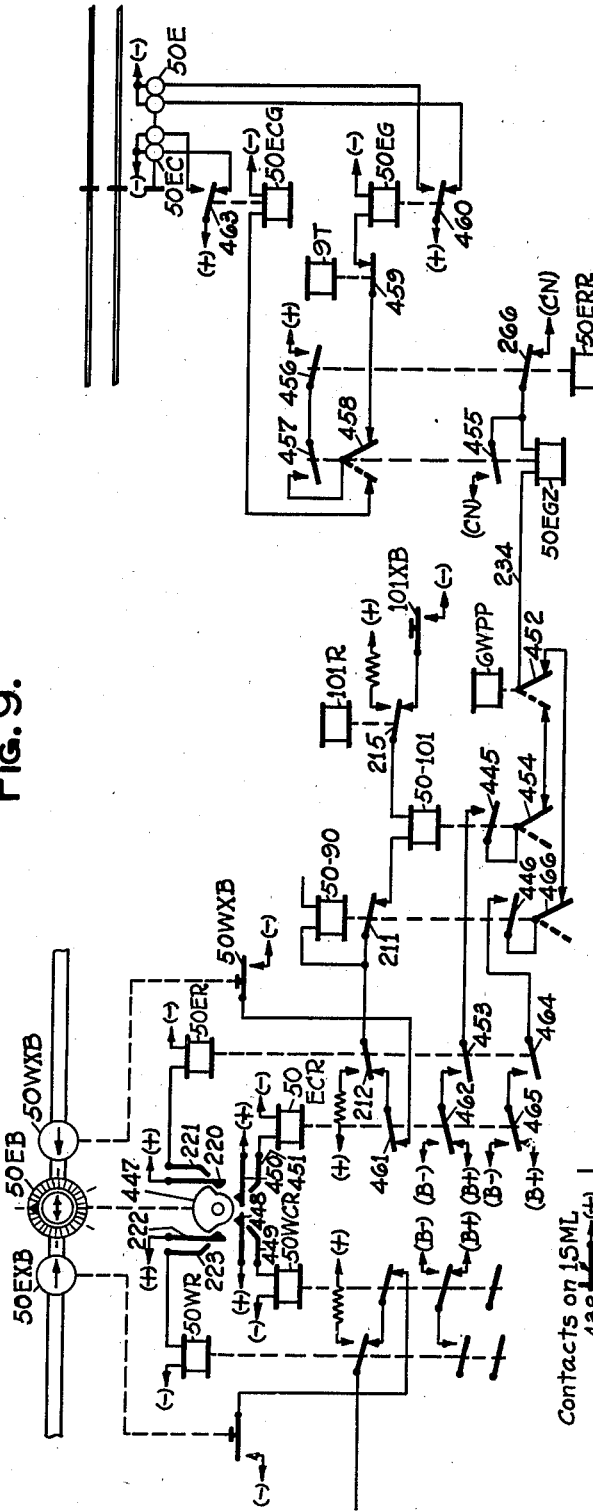
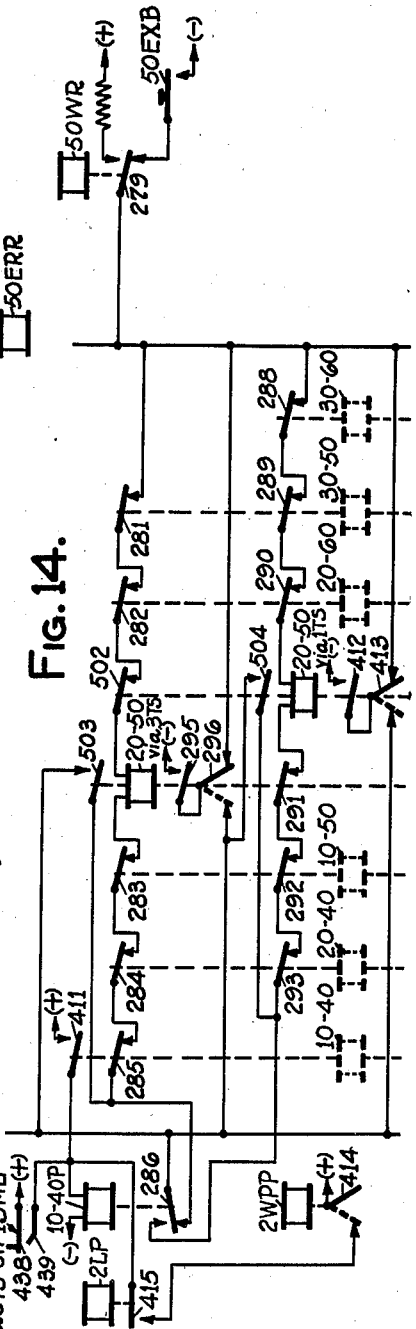
FIG. 9.
FIG. 14.
INVENTOR
S. N. Wight,
BY Neil W. Preston,
his ATTORNEY Dec. 9, 1941.  S. N. WIGHT  2,265,257
INTERLOCKING SYSTEM FOR RAILROADS
Filed March 20, 1936   14 Sheets-Sheet 14
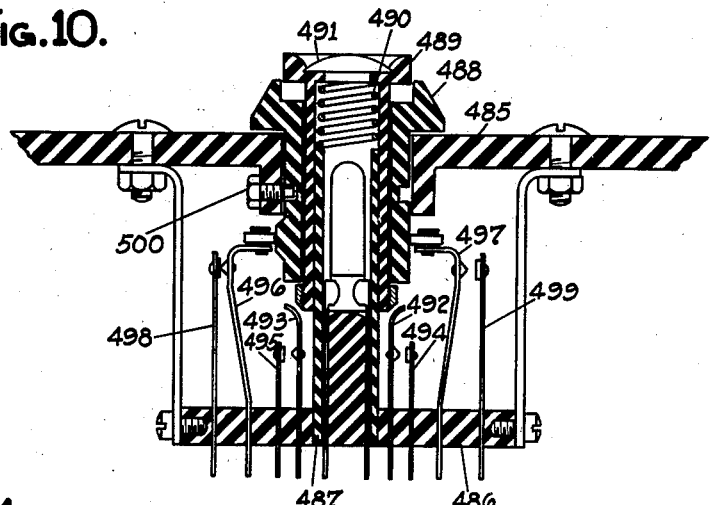
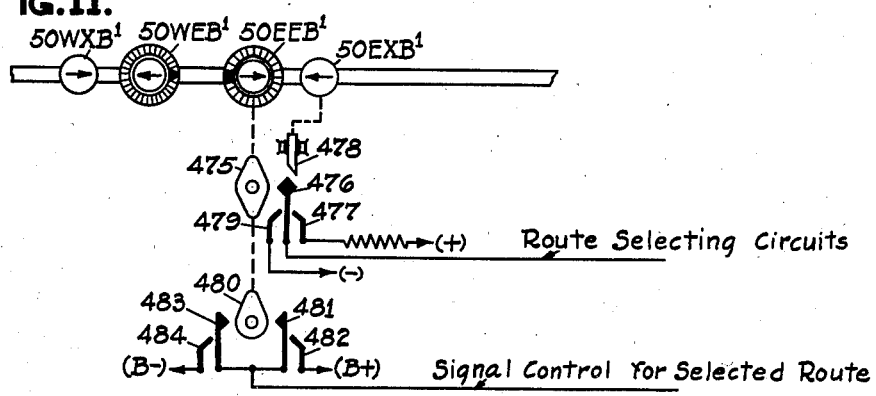
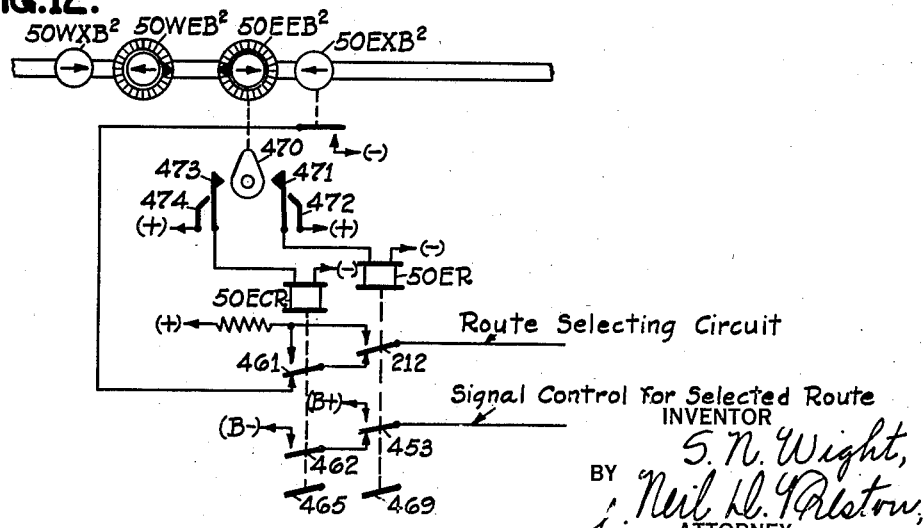

Patented Dec. 9, 1941

2,265,257

UNITED STATES PATENT OFFICE 2,265,257

INTERLOCKING SYSTEM FOR RAILROADS

Sedgwick N. Wight, Rochester, N. Y., assignor to General Railway Signal Company, Rochester, N. Y.

Application March 20, 1936, Serial No. 69,905

61 Claims. (Cl. 246—134)

This invention relates to interlocking systems for railroads, and more particularly pertains to such an interlocking system in which a miniature track layout in a control office has located thereon the controlling buttons or levers for setting up the desired routes through the actual track layout, and in which the electric circuit connections between such buttons or levers and their respective traffic controlling devices accomplish all of the interlocking between the various traffic controlling devices employed for the establishment of routes through the track layout.

The present invention relates to improvements in such a system over the interlocking system disclosed in my prior Patent No. 2,121,846 dated June 28, 1938; and no claim is made herein to any subject matter disclosed in that prior patent.

The organization of the system embodying the present invention contemplates a miniature track layout located in the control office which corresponds to the actual track layout in the field. On this miniature track layout are located route initiating buttons or levers at those points on the miniature track layout which corresponds to the signal locations on the actual track layout in the field. Associated with these initiating route buttons or levers are suitable route completion buttons or levers which are located at those points on the miniature track layout which correspond to the exit or leaving ends of such routes. In order to establish the movement of traffic in a particular direction over a particular trackway route, the operator actuates the route initiating button at the entrance to the desired route and then actuates the completion button at the exit end of such route.

This operation of an initiating button and a completion button on the miniature track diagram, provides that all of the switches in such route are automatically operated to the proper positions after which the signal for that route clears to allow the passage of traffic over the route if traffic conditions are safe for such passage.

In accordance with the present invention, the preferred form of initiating button is a knob which may be turned to a particular position in which it will remain; while the completion button is of the self-restoring push button type. Such an arrangement renders a cleared route wholly dependent upon the restoration of only the initiating route button as far as manual control is concerned. From this brief consideration of the operating characteristics of the present invention, it will be readily appreciated that this type of system may be aptly termed entrance-exit route interlocking, which may be further abbreviated as "NX interlocking." For this reason, the initiating buttons are termed entrance buttons, while the completion buttons are termed exit buttons.

The system of the present invention not only provides for the automatic operation of the switches included within a route upon the operation of entrance-exit buttons (or initiating and completing route buttons), but also provides that certain switches which are included in related conflicting routes, may be automatically operated to positions out of conflict with such established route in order to provide what has been termed derail protection. Such protection of course does not derail a train which runs by a stop signal, but merely routes it over a trackway that does not conflict with the established route.

In many interlocking plants the track layout provides several optional routes between any particular two entrance-exit points in the track layout. The present invention provides that, if an entrance button and an exit button are actuated for such entrance-exit points on the track layout, a particular one of such optional routes will be automatically set up; but, if such preferred optional route is already locked due to the establishment of some other route or due to traffic conditions, then the system of the present invention automatically sets up another of the optional routes. This automatic routing around over the optional routes is also supplemented by manual control so that the operator may determine that an inferior route be employed irrespective of whether the superior route is in condition for use or not.

Another feature of the present invention provides that any particular section of trackway may be divided into several route elements for one direction of traffic, but employed as a single route element for the opposite direction of traffic.

The means employed in the embodiment of the present invention to accomplish the setting up of the routes following the actuation of the initiating and completion route buttons is provided in the form of electric circuits selected by suitable contacts on the route buttons and on route relays of conflicting routes, which route relays are energized in accordance with the energization of such electric circuits.

These route relays, thus selectively energized, are employed to set up individual controls for the track switches and for the signals governing traffic. These individual controls for the traffic controlling devices in the actual track layout are interlocked by circuits preferably located adjacent to the track layout in a manner to provide the greatest degree of safety in accordance with the conditions of practice.

Other objects, purposes and characteristic features of the present invention will be in part obvious from the accompanying drawings, and in part pointed out, as the description of the invention progresses.

In describing the invention in detail, reference will be made to the accompanying drawings, in which like reference characters designate the same parts throughout the several views; in which like letters in the reference characters designate similar functions or relationships with the distinctiveness between such reference characters provided by the use of distinctive preceding numerals; in which like preceding numerals in the reference characters, when applied to different letters, represent the inclusion of such device within a particular group; and in which.

Figure 1:
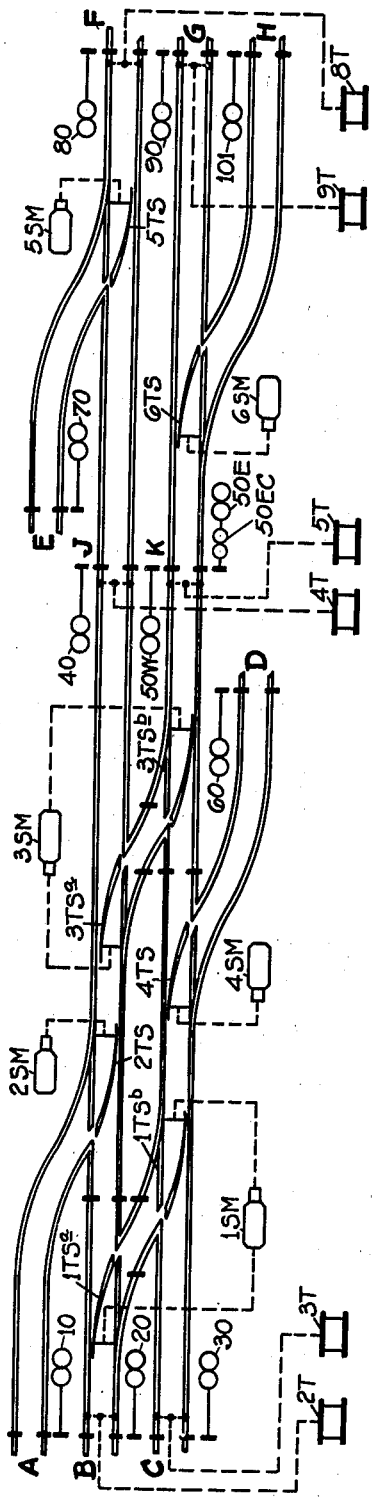
Fig. 1 shows the track layout in the field to which the embodiment of the present invention is applied and includes within such figure the switches, switch machines, signals and track relays which are associated with the trackway.
Figure 13:
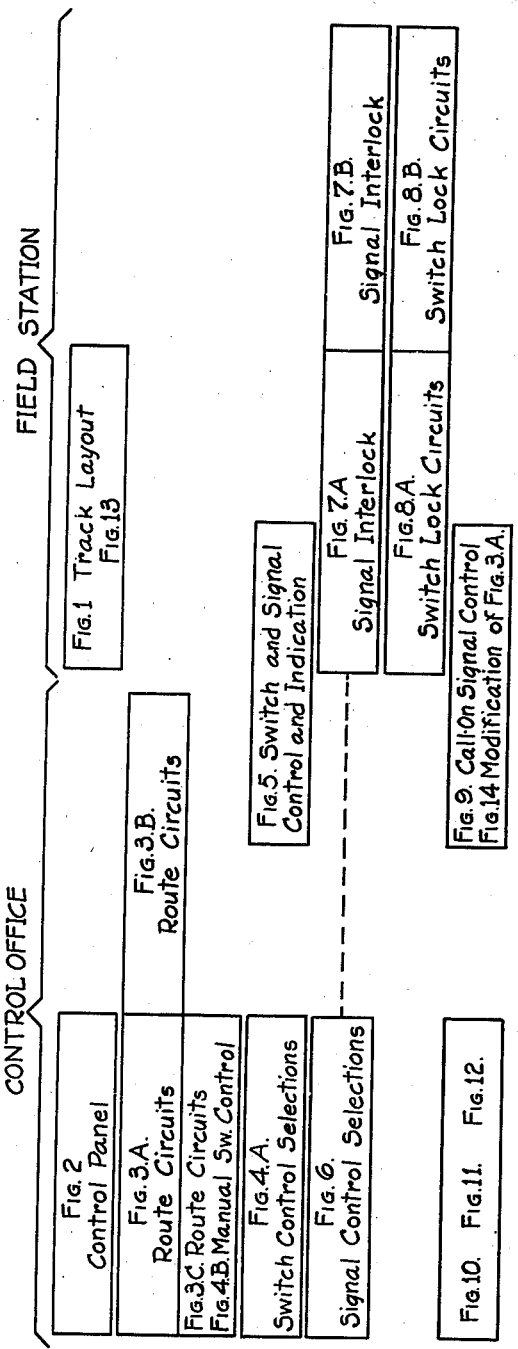
Figure 2:
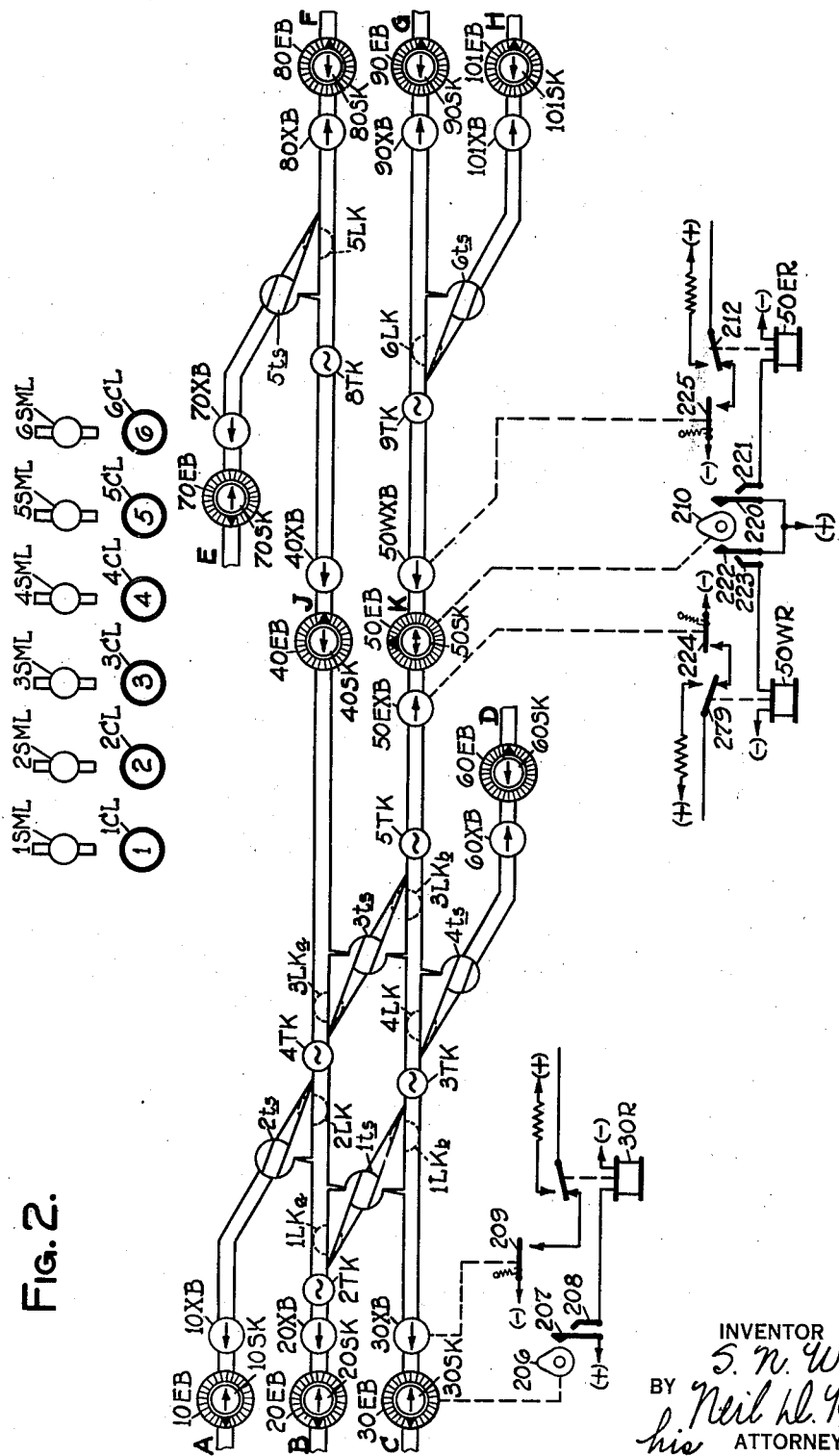
Fig. 2 illustrates the miniature track diagram in the central office as employed in connection with the track layout illustrated in Fig. 1.
Figure 6:
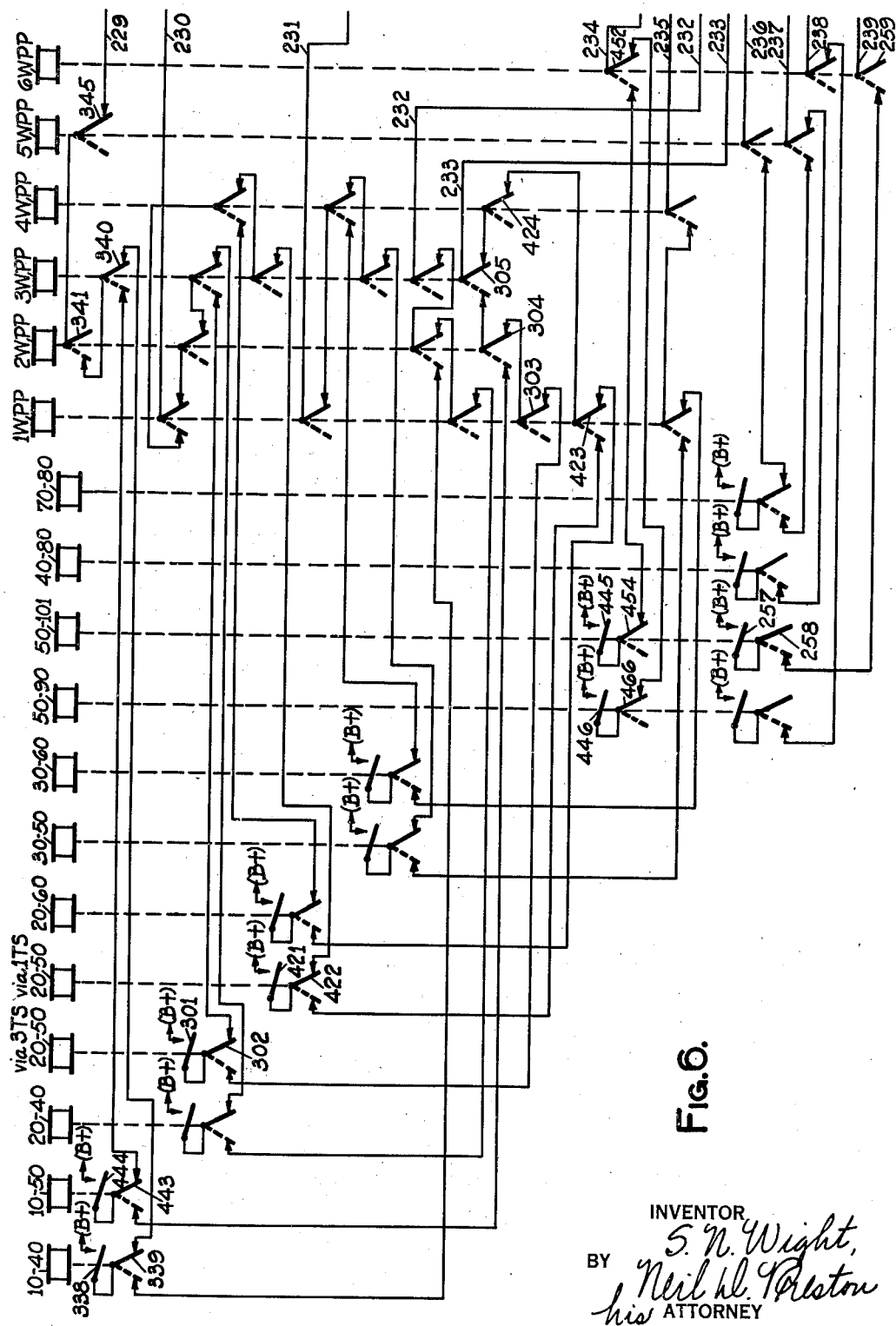

Figs. 3A, 3B and 3C, when arranged as indicated in Fig. 13, illustrate the route circuits in the central office associated with the entrance and exit route buttons disclosed in Fig. 2;

Figs. 4A and 4B, when considered together as later described, disclose how switch operation is governed by the route relays and by the emergency switch levers (Fig. 4B is included on the same sheet with Fig. 3C);

Fig. 5 illustrates the control and indication of a typical switch and signal from a central office, which typical control and indication is considered to be associated with each of the track switches and signals of Fig. 1, but has been shown for only a single switch for the sake of simplicity in the disclosure;

Fig. 6 discloses the signal control circuit selections on the route relays of Figs. 3A, 3B and 3C and the switch position repeating relays, one of which has been shown in Fig. 5;

Figs. 7A and 7B, when placed end to end as shown in Fig. 13, disclose the interlock for the signals as selected through the switch position relays and the lock relays, which have been shown in Figs. 8A and 8B;

Figs. 8A and 8B, when arranged as indicated in Fig. 13, disclose typical circuits for the lock relays, one of which has been shown associated with its switch in Fig. 5;

Fig. 9 discloses a typical call-on signal control as associated with the entrance-exit buttons for a double intermediate signal location;

Fig. 10 illustrates in detail one form of initiating and completing route buttons combined in a unitary device;

Fig. 11 shows a modified form of initiating and completing route buttons which may be used in place of the form shown in Fig. 2;

Fig. 12 illustrates the manner in which a call-on signal control may be associated with a single signal as well as with a double intermediate signal as disclosed in Fig. 9;

Fig. 13 (included on the same sheet with Fig. 1) discloses the arrangement of the drawings which will give the most comprehensive view of the organization of the system as distributed between a control office and the field location; and Fig. 14 is a fragmentary portion of Fig. 3A modified in accordance with the present invention to obtain positive selection of the optional routes.

Instead of showing a complete circuit arrangement by placing a large number of sheets side by side, a simplified method of disclosure has been employed wherein all of the control circuits for any one relay are shown in a continuous relationship; while all of the circuits which that relay may control are distributed between the several sheets of drawings upon which that relay is shown in block form.

For the purpose of further simplifying the illustration and facilitating in the explanation thereof, the conventional parts and circuits constituting the embodiment of the invention have been shown diagrammatically and certain conventional illustrations have been employed, the drawings having been made more with the idea of making clear the purpose and principles of the present invention together with its mode of operation than with the idea of illustrating the specific construction and arrangement of parts that would probably be employed in practice.

The various relays and their contacts are illustrated in a conventional manner and symbols are employed to indicate connections to the terminals of batteries or other suitable sources of electric current supply instead of showing all of the wiring connections to such terminals.

The symbols (+) and (—) are employed to indicate the positive and negative terminals respectively of suitable batteries or other sources of electric energy; and those terminals with which these symbols are used are presumed to have current flowing from the positive terminal designated (+) to the negative terminal designated (—). The symbols (B+) and (B—) indicate connections to the opposite terminals of suitable batteries or other sources of energy which have central or intermediate taps designated (CN); and the circuits with which these symbols are used, may have current flowing in one direction or the other depending upon the particular terminal used in combination with the intermediate tap designated (CN).

For convenience in the illustration, certain of those terminals which are designated (CN) are considered to be connected together in place of showing a common wire connection as would be necessary in practice. The symbols employed with any one local circuit are considered to designate the terminals of the same battery or other suitable source, but as many separate sources may be provided as found necessary, or as many sources may be combined in a single source as found necessary or expedient in the practice of the invention. If alternating current is employed, then these symbols should be considered to represent the instantaneous relative polarities of the respective terminals.

Where groups of devices are referred to in a general way, such devices will be designated by the letters or preceding numerals characteristic of such group instead of citing each specific reference character of that group.

APPARATUS IN GENERAL

*Track layout—Fig. 1*

In the accompanying drawings, the invention has been shown applied to a track layout including a stretch of double track having two crossovers and four turn-out tracks. It should be understood that the invention is not limited, as thus shown, to the control of the switches and signals of this chosen track layout, but may be extended for any desired number of switches and signals and may be readily applied to all types of track layouts commonly found in interlocking plants.

The stretch of double track includes a main line extending from B to F, and another main line extending from C to G. These two main lines are connected by two cross-overs designated as having track switches ITSa—ITSb and 3TSa—3TSb. Inasmuch as the opposite ends of a cross-over are usually operated at the same time, the switches ITSa and 1TSb will be referred to as cross-over switch ITS; and similarly the switches 3TSa and 3TSb will be referred to as cross-over switch 3TS. A turnout track is shown as extending from the point A to the main line track B—F connected thereto by a track switch 2TS. Similarly, a turnout track extending from E is connected to this main line track B—F by track switch 5TS. Both of these turnout tracks are illustrated as providing for west-bound facing point train movements.

A turnout track extends from the point D to the main track C—G connected thereto by a track switch 4TS; and similarly, a turnout track extends from H to this main train C—G connected thereto by a track switch 6TS. These two turnout tracks provide for east-bound facing point train movements.

The track switches ITS, 2TS, 3TS, 4TS, 5TS and 6TS are respectively operated by power switch machines ISM, 2SM, 3SM, 4SM, 5SM and 6SM, which switch machines may be of any suitable type, such, for example, as disclosed in the patent to W. K. Howe, Patent No. 1,466,903, dated September 4, 1923.

The track switches of a cross-over are controlled together, as indicated by the dotted lines in Fig. 1, that is, the track switches ITSa and ITSb are illustrated as operated by the switch machine ISM; while the track switches 3TSa and 3TSb are illustrated as operated by the switch machine 3SM. However, separate switch machines may be employed for each switch, if desired, with both switch machines jointly controlled from the same switch control relay WZ, mentioned later.

Signals 10, 20, 30, 60, 70, 80, 90 and 101 are respectively provided to govern traffic from the points designated A, B, C, D, E, F, G and H. In addition to such signals, a signal 40 is provided for governing west-bound traffic intermediate of the signals 10 and 20 with respect to the signal 80. Likewise, signals 50W and 50E are provided to govern traffic in west and east bound directions, respectively, intermediate of the signals 10, 20 and 30 with respect to the signals 90 and 101. The signal 50EC is a call-on signal, which is a signal that can be cleared even though the section in advance is occupied, but with the significance that a train accepting such a signal must be prepared to stop on sight of obstruction. Other such signals may be provided if desired.

These signals for governing traffic through the track layout, are assumed to be light signals giving the usual indications of green for clear and red for danger or stop, and if an added indication is desired, yellow for caution. However, these signals may be of the search light type, semaphore type, or any other type of signal instead of the type chosen for the embodiment of the present invention.

The track layout illustrated in Fig. 1 has been shown as divided into track circuit sections by insulated joints indicated in the usual manner. These track sections are provided with track batteries and track relays of which the track relays 2T, 3T, 4T, 5T, 8T and 9T are illustrated. These normally energized track circuits are wired in the usual manner to provide for fouling sections and to provide for the isolation of such circuits in the case of cross-overs and the track switches, such details of wiring having been omitted for the sake of simplicity in the disclosure. These track circuits could, of course, be subdivided or lengthened as desired, and arranged in accordance with any of the usual practices.

*Field apparatus*

The track layout chosen as having the embodiment of the present invention applied thereto, has certain field apparatus associated therewith which is preferably located along the trackway, which field apparatus is connected to the central office by suitable line wires as a means of communication therewith. Each track switch of the track layout has certain devices associated therewith which are typical of every track switch, so that more particular consideration has been given to the track switch 6TS, the location of which can be readily ascertained from Fig. 1, with regard to the control thereof from the central office, as well as the indication of its position in the central office for the selection of certain signal circuits and for keeping the operator properly informed, instead of showing such typical individual control and indication for each track switch. This typical control and indication of switch 6TS is shown in Fig. 5.

With reference to Fig. 5, the track switch 6TS is shown as having associated therewith a switch position repeating relay 6WP. This relay is of the polar neutral type and is energized with one polarity or the other in accordance with the normal and reverse locked positions of the track switch 6TS and switch machine 6SM, and is deenergized whenever the track switch 6TS is unlocked or is in operation. The polarized circuit for controlling such a switch position repeating relay (as relay 6WP) is energized with one polarity or the other through the contacts of a suitable point detector contact mechanism such as shown for example in the patent to C. S. Bushnell, No. 1,517,236, dated November 25, 1924.

A switch control relay 6WZ is provided for the switch machine 6SM and is controlled from the central office, as will be hereinafter described. Associated therewith are normal and reverse correspondence relays 6NCR and 6RCR of the usual neutral type. With the track switch 6TS in a normal position in correspondence with the normal position of the switch control relay 6WZ, the relay 6NCR is energized by a circuit closed from (+), through a circuit including front contact 201 of relay 6WZ, polar contact 203 of relay 6WZ, in a right-hand position, windings of relay 6NCR, polar contact 204 of relay 6WP in a right-hand position, front contact 205 of relay 6WP, to (—). When the track switch 6TS is in a reverse position in correspondence with the relay 6WZ in a reverse position, then the relay 6RCR is energized, as will be apparent from the drawings. A relay WP, its related NCR and RCR relays, and a WZ relay are associated with each of the track switches and each of the cross-overs in the track layout.

Associated with each track switch and each cross-over is a lock relay L shown as relay 6L in Fig. 5. Each of the lock relays is controlled in accordance with the traffic conditions and the condition of the signals, as will be described later in connection with the lock circuits shown in Figs. 8A and 8B for the lock relays L for the various track switches TS in Fig. 1. These lock circuits employ directional route locking relays ES and WS of the neutral relay type for purposes hereinafter pointed out in detail.

It is to be understood that the lock relay association with the control of the track switches, as illustrated in Fig. 5 with respect to track switch 6TS, may be modified in accordance with the principles shown in my prior application Ser. No. 689,109 filed September 12, 1933. It is also to be understood that approach locking and time release means may be used in connection with these lock relay circuits in accordance with the usual practices, such as shown for example in the prior patent of Larry and Langdon Patent No. 2,125,242 dated July 26, 1938.

Each of the signals in the field is controlled by a relay G, which has been shown in Fig. 5 as relay 101G for the signal 101. Each relay G is controlled by a relay GZ which in turn is manually controllable from the central office, and also by relay RR which is controlled in accordance with the interlock with the other signals of the interlocking plant. It is to be understood that the relays GZ may be of either a neutral type or a polar-neutral type as required. In the illustration of Figs. 7A and 7B, all of the relays GZ are shown as neutral relays except relay 50EGZ (Figs. 7B and 9) which is shown as a polar-neutral relay for the purpose of furnishing a call-on signal control explained in connection with Fig. 9.

In Fig. 5, the relay 101GZ is illustrated as being controlled over a line circuit extending from the central office and as being associated with a relay 101RR which is interlocked with the other GZ and RR relays as shown in detail in Figs. 7A and 7B. The relay 101G is normally deenergized thereby closing back contact 217 and causing the red or stop indicator of signal 101 to be illuminated, but when the relays 101GZ and 101RR are both energized, subject to conditions hereinafter described, the relay 101G is energized by a circuit closed from (+), through a circuit including front contact 218 of relay 101GZ, front contact 219 of relay 101RR, windings of relay 101G, to (—). This energizes the relay 101G closing its front contact 217 to thereby energize the green or proceed indicator of the signal 101.

Fig. 5 shows in detail the control circuit for the relay 101GZ extending from the control office, but it is to be considered that each of the GZ relays shown in Figs. 7A and 7B have their corresponding control wires connected to similarly designated control wires shown at the right of Fig. 6 so that the control circuits for all of the GZ relays are actually shown, although the sheets including Figs. 6, 7A and 7B have not been arranged to be laid side by side for the sake of simplifying the circuits in Figs. 7A and 7B.

All of the signal control relays GZ are interlocked in the field by selecting circuits as shown in Figs. 7A and 7B, which selecting circuits are taken through contacts on the lock relays L and the normal and reverse correspondence relays NCR and RCR for the various switches and cross-overs in the track layout dependent upon such particular track layout. In these selecting circuits are included series neutral relays RR which manifest when their respective selecting circuits are energized. In certain cases, depending upon the track layout, it is necessary to provide repeater relays and separate certain of the selecting circuits to avoid difficulty in undesirable cross connections and such relays are designated by the letter reference characters XRR. In the case of a double intermediate signal the relays GZ and RR are distinguished as associated with the signals for the opposite directions by the letters E and W.

*Office apparatus.*—The central office is provided with a control machine having a control panel (see Fig. 2) on which is located the control levers (or buttons), indicators and a miniature track diagram representative of the actual track layout in the field.

A movable miniature track switch point is preferably located on the track diagram to represent each of the track switches of the track layout in the field, such as miniature switch points 1ts, 2ts, 3ts, 4ts, 5ts and 6ts represent the corresponding switches shown in Fig. 1. These miniature track switch points are electro-magnetically operated and may indicate the actual positions of their corresponding switches in a manner disclosed in my pending application Ser. No. 431,748, filed February 27, 1930, but in accordance with the preferred form of the present invention, these miniature track switch points are shown as controlled in accordance with the route control set up by the operator on the control panel, and suitably set flush with the surface of the panel. One end of the single switch miniature points is circular, while the center of the cross-over miniature points is circular, so that the points may be operated by their magnetic operating means to normal and reverse positions. The trackway connecting the miniature switch points is a grooved recess extending along the panel and made distinctive by retaining a suitably colored strip, such as white Celluloid, so as to be distinctive against a black panel of Bakelite or the like.

In back of the movable switch points ts and beneath the Celluloid strip are suitable switch lock indicating lamps designated by the letter reference characters LK with suitable preceding numerals corresponding to the track switches with which they are associated. These lock indicators are illuminated under certain conditions more specifically described hereinafter, but when illuminated with the miniature track switch point in a particular position not only gives the indication significance assigned to its illumination, but also clearly brings out the position of the miniature track switch point and the route which the corresponding track switch sets up (see Fig. 2). This is because the miniature point covers the part of the indicator lamp not in the route mechanically set up. Typical control for these lock lamps LK has been disclosed in Fig. 5 by showing the control for 6LK.

Suitable track occupancy indicating lamps TK are provided which have been given distinctive preceding numerals corresponding to the preceding numerals associated with the respective track relays by which they are controlled.

At each traffic or route determining point on this miniature track layout, corresponding to the point on the actual track layout where signals are located, a suitable rotary control lever or route button designated by the letter reference characters EB and indicated as associated with the corresponding signals in the field by their preceding numerals which respectively correspond with the numbers of such signals. These rotary route buttons EB have been shown as having markers thereon which indicate the existing positions of the buttons, which buttons may be rotated to the right or to the left. These route buttons EB are also termed entrance buttons, as they are located at the entrance to their respective routes. Within the center of such route buttons (or knobs) are suitable indicator lamps SK which are stationary with respect to the rotatable knob and have located thereon arrows which indicate the direction of traffic which the associated signal governs. Although only the lamp proper of indicator 101SK has been shown in detail (see Fig. 5), it is to be understood that a similar lamp is included in each of the indicators illustrated as associated with the several entrance buttons EB. These indicators SK are illuminated when the corresponding signal is cleared in response to the rotation of the route button in a corresponding direction and the actuation of a completion or exit button XB for the opposite end of the route. The exit buttons XB are located on the panel usually adjacent entrance buttons, and are used by the operator for designating the ends of routes. These exit buttons XB are preferably constructed so as to be of self-restoring push button type.

Located on the panel above the miniature track diagram representing the track layout, are suitable emergency switch levers SML which provide for the individual operation of their respective track switches under circumstances to be described in detail hereinafter. These emergency switch levers have been specifically shown as levers 1SML, 2SML, 3SML, 4SML, 5SML and 6SML. Beneath these emergency switch levers are indicators 1CL, 2CL, 3CL, 4CL, 5CL and 6CL which are illuminated whenever the track switch is out of correspondence with its control, irrespective of whether such control is accomplished by the entrance-exit buttons EB and XB or by the individual emergency control levers SML. The indicators CL have opaque numbers on the indicator lens, which numbers are assigned to the respective switches so as to readily identify the switch levers.

Under normal conditions all of the indicating lamps on the panel are deenergized so as to present a normally dark panel to the operator in the preferred embodiment of the invention.

Each of the entrance buttons EB operates suitable contacts. More specifically, the entrance button 30EB operates cam 206 so as to close a circuit through the contacts 207 and 208 when the button 30EB is rotated to the right until its pointer is in a vertical position. This obvious circuit energizes the repeating relay 30R, and it is to be understood that each entrance button similarly controls its repeating relay R which has been merely indicated in Figs. 3A, 3B and 3C.

It will be apparent that, when an entrance button such as 50EB is employed to govern opposite directions, the rotation of such button to the right operates the cam 210 to close contacts 220 and 221, while the rotation of 50EB to the left closes contacts 222 and 223.

Closure of contacts 220 and 221 energizes relay 50ER, while closure of contacts 222 and 223 energizes relay 50WR.

It is of course to be understood that although rotary entrance buttons or knobs EB have been illustrated and contemplated in accordance with the embodiment of the present invention, that other suitable manually operable contact means might be employed, such as a three position snap switch or the like, and still be within the scope of the invention. Although repeater relays, such as 30R for example, are preferably employed, all of the selections made on such relays may be made on contacts directly controlled by the entrance buttons EB.

The exit buttons XB are of the self-restoring push button type which, when depressed, actuate their contacts to circuit closing positions. This has been shown in Fig. 2 by connecting the exit button 30XB to spring biased contact 209 with a dotted line. Similarly, the exit buttons 50EXB and 50WXB are connected to their respective spring biased contacts 224 and 225 to indicate such a manual control. Although Fig. 2 shows only the contacts for the exit buttons just mentioned, it is to be understood that similar contacts are associated with each of the exit buttons shown, and these contacts have been shown by push button symbols with the same reference characters in the Figs. 3A, 3B and 3C.

The preferable form of control panel employed with the present invention has been described above, but it is to be understood that the principles of the present invention so far as the operation of the system is concerned may be employed with control panels of various tpyes and still be within the scope of the present invention. For example, a track diagram with the indicators mentioned above might be located in an upright position along a wall while the control levers or buttons might be mounted on an abbreviated track diagram located on a desk and made so as to be readily accessible to the operator. Such a separation of the control buttons and the indicators might also take another form by having the control buttons arranged in different levels for the different tracks along the lines of a typewriter key board. However, these forms, which show the flexibility of the present system, do not appear to have the desirability of the form shown, as Fig. 2 clearly illustrates the ease by which the operator may designate the passage of a train over a particular route and readily identify the indications of such route with the controls for such route by reason of the proximity of the control buttons and the indicators.

The control office apparatus includes beside the control panel, various relays and circuits which set up the individual controls transmitted over line circuits to the field location. What may be termed as the first step in the operation of the system following the actuation of an entrance button EB and an exit button XB may be considered the route interlock between the various entrance and exit buttons, which has been described in detail in Figs. 3A, 3B and 3C of the accompanying drawings.

*Route circuits Figs. 3A, 3B and 3C.*—The sheets of drawing containing Figs. 3A and 3B should be placed end to end with the sheet containing Fig. 3C placed below Fig. 3A as indicated in Fig. 13. These three figures, when thus combined, show the route selecting circuits for the entrance and exit buttons shown in Fig. 2. In these figures, the entrance buttons EB have been merely indicated by dotted lines as associated with their respective repeating relays R, so as to readily bring out the manual control of the repeating relays R and readily identify such operation with the entrance buttons shown in Fig. 2. Similarly the exit buttons of Fig. 2 have been shown symbolically as push buttons having the same reference characters as the exit buttons XB in Fig. 2.

The detail functioning of the circuits involved in the setting up of a route will of course be considered in detail hereinafter, but it is thought advisable to point out at this time the various possible routes through the track layout so as to make apparent the significance assigned to the reference characters of the route relays which provide the interlock in these Figs. 3A, 3B and 3C.

When an entrance button EB has been operated followed by the operation of an exit button XB, a route relay is picked up which controls the apparatus individual to that particular route and which prevents all other route relays of conflicting routes from being energized by reason of its contacts included in the pick up circuits of all such conflicting route relays. Each of these route relays is energized with a polarity in accordance with the direction of traffic to be set up, all of which will be explained more in detail hereinafter, it being sufficient for the present to merely enumerate the route relays thus controlled and point out that these relays are preferably of the polar neutral type in which the neutral contacts are picked up only while the relay is energized and the polar contacts remain in their last actuated positions. For convenience in consideration of the various routes and the enumeration of the route relays, the table given below gives the route relay designation and the points between which the traffic may pass when such route is cleared. These routes may be seen by reference to Fig. 1.

| Route relays | Routes through track layout |
| --- | --- |
| 10–40 | A to F and J to A. |
| 20–40 | B to F and J to B. |
| 10–50 | A to K and K to A. |
| 20–50 via 3TS | B to K via 3TS and K to B via 3TS. |
| 20–50 via 1TS | B to K via 1TS and K to B via 1TS. |
| 20–60 | B to D and D to B. |
| 30–50 | C to K and K to C. |
| 30–60 | C to D and D to C. |
| 50–90 | K to G and G to K. |
| 50–101 | K to H and H to K. |
| 70–80 | E to F and F to E. |
| 80–40 | F to J. |

The route relays, enumerated above, govern the individual switch control relays Z which cause the transmission of controls to the field in a manner shown in detail in connection with the relay 6Z for the track switch 6TS in Fig. 5, it being understood that there is a relay Z for each track switch or crossover, such relays being shown in Fig. 4A together with the circuit selections on the route relays by which they are governed. These relays Z control the individual switches as designated by their preceding numerals, and are of the usual polar-neutral type. Each relay has two windings so controlled that the neutral contacts of the relay are picked up only when one or the other of the windings of this relay is energized but such neutral contacts do not pick up when both windings are energized. Their polar armatures remain in their last actuated positions.

In Fig. 4A, the jumpers within the dotted rectangles E represent the contacts for the emergency levers SML of Fig. 2. The details of such control has been illustrated in Fig. 4B by the typical control for the relay 6Z by lever 6SML. It is to be noted that the emergency levers of Fig. 2 have been given the same preceding numerals to their reference characters as these dotted rectangles of Fig. 4A and such dotted rectangles are considered to represent and include a lever and its contacts such as shown in Fig. 4B.

The control office also includes a lock repeating relay LP for each track switch, which relay is associated with the respective Z relay for that switch (see Fig. 5 for typical relay LP).

The control of a track switch is accomplished by its relay Z over a switch control line circuit, which has been shown in Fig. 5 specifically for the track switch 6TS as including line wire 226 employed with a common return line (CN) (not shown). It is to be understood that each of the track switches has a similar switch control circuit connecting its relay Z in the office with its relay WZ in the field. Similarly, there is a switch position indicating circuit for each of the track switches which controls a relay WPP in the central office so as to give the proper indications with respect to the track switches. This switch indication circuit has been shown in Fig. 5 as including line wire 227 in combination with the common return line (CN) for controlling the relay 6WPP.

The control office equipment includes a signal repeating relay GR for each of the signals which energizes or deenergizes the signal indicator lamps SK in accordance with the condition of the respective signals. Each of these relays GR is controlled over a line circuit in accordance with the energization of its signal control relay G at the field location. In Fig. 5, the relay 101GR for the indicator 101SK has been shown as controlled over the line wire 228 and the common return line (CN) by the relay 101G. The relays GR are of the neutral relay type.

*Signal control selections Fig. 6.*—Following the operation of the track switches so that the trackway physically sets up a route, and providing traffic conditions are proper, the signal for governing the entrance of traffic to that route is cleared over an individual control circuit. The selections for such signal controls are shown in Fig. 6 as governed by the route relays and selected through contacts of the switch position repeating relays WPP. The wires at the right of Fig. 6 connect over suitable line wires to the relays GZ of Figs. 7A and 7B as indicated by the corresponding reference characters given to such wires and as also indicated in Fig. 13 by the dotted line.

Such a line circuit control for a signal has been shown in Fig. 5 with respect to signal 101 as including line wire 239, so as to make readily apparent the manner in which each of these signal circuits connect up with their respective GZ relays.

*Signal interlock Figs. 7A and 7B.*—After the signal controls are transmitted to the field location, it is desired to provide an interlock between such controls in the field and the actual positions of the track switches in the field, together with certain automatic controls, so that interlocking circuits are located adjacent the field apparatus and are specifically shown in the Figs. 7A and 7B.

These Figs. 7A and 7B illustrate the signal control relays GZ as interlocked for opposing directions through suitable circuits, which circuits, if energized, permit the clearing of a signal and such energization is made dependent upon the locked condition of the track switches as determined by the lock relays L. Each of these selecting circuits includes two series relays RR, one for each end of the route. Certain of these interlocking circuits require added relays and added selections and such additional relays are designated by the letters XRR.

*Switch lock circuits Figs. 8A and 8B.*—Even after the transmission of a signal control to the field location, it is desired to insure that the switches in the route are locked before a signal be cleared. Thus, each of the lock relays for the switches in a route are deenergized upon the transmission of the signal control so that the signal interlocking circuits will be closed through back contacts of the lock relays. Each of the lock relays for the track switches have been shown in block form in Figs. 7A and 7B, but the details of the control for these lock relays L have been shown in Figs. 8A and 8B.

For the purpose of indicating the track occupancy conditions in the control office, a direct wire line circuit is provided for a track repeating relay for each of the track sections. As typical of this, the track relay 9T is shown in Fig. 5 as having a contact 251 which controls its track repeating relay 9TP in the control office over a direct wire line circuit including line wire 270 and the common return line. The deenergization of the track relay 9T deenergizes its repeater relay 9TP and closes back contact 276 to energize the track indicator 9TK whenever there is a train on the associated track section. It is to be understood that the other track indicators shown in Fig. 2 are similarly controlled by their respective track relays shown in Fig. 1, although other line circuit arrangements might be employed within the scope of the invention.

It may be noted that suitable call-on signal controls may be associated with each of the signal levers, as shown in Figs. 9 and 12, but this feature will be discussed more in detail hereinafter as such a feature is considered to be applicable to any of the signals shown in the track diagram but it is desired to discuss this in connection with but a single signal in order to simplify the present disclosure.

It is believed that the characteristic features and purposes of the present invention will be more clearly understood by now discussing the general operation of the system, reference being made from time to time to the various figures to which attention should be directed in order to understand the interrelation of the apparatus with Fig. 13 more particularly pointing out the location of the apparatus.

GENERAL OPERATION

*Normal conditions.* — Although the track switches TS are usually left in their last operated positions, they have been shown in positions required for the passage of main line traffic (see Figs. 1 and 2). The signals are of course normally "at stop." As the signals are illustrated as being of the color light type, it is to be understood that the lower or red indicator of each signal is normally illuminated, as can be readily ascertained from Fig. 5, which shows the detail control for the signal 101 by its relay 101G, relay 101RR and relay 101GZ.

With the track sections unoccupied, the track relays T are normally picked up.

With all of the entrance buttons in their normal positions, as shown in Fig. 2, the signals governing traffic over the trackway illustrated in Fig. 1 are all at stop, and all of the track switches are free to be operated.

*Establishing a route.*—Let us assume that a train is standing on the track section in approach to the signal 101 and that the operator desires to have this train pass from H (the location of signal 101) to K (the location of signal 50W). To do this, the operator turns the entrance button 101EB counterclockwise which closes suitable contacts (similar to contacts 222 and 223) for energizing its repeating relay 101R (see Fig. 3B). The operator then directs his attention along the trackway until he comes to the exit button 50WXB for the desired route, which button he then momentarily depresses.

The contemporaneous actuation of the entrance button 101EB and the exit button 50WXB closes an energizing circuit for the route relay 50—101 (see Figs. 3A and 3B) by reason of a circuit closed from (+), through a circuit including front contact 215 of relay 101R, winding of route relay 50—101, back contact 211 of route relay 50—90, back contact 212 of relay 50ER, back contact of exit button 50WXB, to (—).

The energy which flows in this pick up circuit for the route relay 50—101, flows in such a direction as to actuate its polar contacts to the left and to pick up its neutral contacts. This response of the route relay 50—101 connects (—) potential to the left hand terminal of relay 50—101 through front contact 213 and polar contact 214 in a left hand position, so that this relay 50—101 remains energized even after the operator releases the exit button 50WXB.

The operator in actuating the entrance button 101EB followed by the actuation of the exit button 50WXB has identified the route which he desires to clear for the passage of traffic, and this identification or designation of the route is stored in the route relay 50—101 until the entrance button 101EB is restored to its normal position.

The route relay 50—101 controls all of the individual devices required for the setting up of the route over the trackway and the clearing of the signal for that route. These individual controls may be readily divided into several groups to facilitate the discussion of the operation, as for example, the switch control for the various switches involved in the route, the signal control for the signal governing the route, route locking and the interlock between the signal of that route for the desired direction with the signal for the opposite direction over such route.

*Swith control.*—The response of a route relay closes circuits for energizing a relay Z for each of the track switches associated with the desired route. For the particular route from H to K under consideration, only the track switch 6TS is involved and this switch is directly included in the route. But it may be noted here that other switches may be associated therewith for derail protection purposes and this feature will be described separately.

With reference to Fig. 4A, the relay 6Z is energized by a circuit closed from (+), through a circuit including front contact 240 of relay 50—101, reverse operating bus 430 for relay 6Z, contacts of the emergency switch control lever 6SML (see Fig. 2) as represented by the dotted rectangle 6E, lower winding R of the relay 6Z, to (—).

The energization of the reverse winding R of the relay 6Z operates its polar contacts to the left and causes its neutral contacts to be picked up.

The transmission of the switch control by the relay 6Z is shown in detail in Fig. 5. With the polar contacts of relay 6Z in left hand positions, energy is applied to the control line 226 by a circuit closed from (B+), polar contact 241 in a left hand position, upper winding of relay 6LP, front contact 242 of relay 6LP, polar contact 243 of relay 6WPP in a right hand position, line wire 226, front contact 244 of relay 6L, windings of relay 6WZ, front contact 245 of relay 6L, to the common return line (CN).

This energization of the relay 6WZ causes its contacts to be actuated to left hand dotted line positions so that the polarity of the energy applied to the switch machine 6SM is reversed by contacts 246 and 247, thereby causing the switch machine 6SM to operate the track switch 6TS from its normal locked position to its reverse locked position.

The actuation of the polar contacts of relay 6WZ to the left opens the energizing circuit for relay 6NCR at polar contact 203, and the unlocking of the track switch 6TS during its operation is repeated by the relay 6WP so that the relay 6NCR continues to be deenergized by reason of open contact 205 until the track switch 6TS has been operated to its reverse locked position in which the relays 6WZ and 6WP are again in correspondence. When such correspondence obtains, the relay 6RCR is energized by a circuit closed from (+); through a circuit including front contact 201 of relay 6WZ, polar contact 203 of relay 6WZ in a left hand position, winding of relay 6RCR, polar contact 204 of relay 6WP in a left hand position, front contact 205 of relay 6WP, to (—).

Under normal conditions the relay 6WPP in the office is energized with potential from (B+) through a circuit including polar contact 249 in a right hand position, front contact 250 of relay 6WP, line wire 227, winding of relay 6WPP, to the common return line (CN). When the track switch 6TS is unlocked, front contact 250 is open, so that relay 6WPP is deenergized.

The deenergization of this relay 6WPP closes an obvious energizing circuit at back contact 252 of relay 6WPP for the corresponding lamp 6CL which is located on the control panel (see Fig. 2) beneath the emergency switch machine control lever 6SML. The continued illumination of this indicator 6CL advises the operator that the track switch 6TS is still out of correspondence with its control set up on the panel.

It might also be well to note at this time that even prior to the operation of the track switch, the operator is advised that the reverse route over the track switch 6TS is to be set up by reason of the actuation of the miniature track switch point 6ts to its reverse position by its electro-magnetic means controlled through polar contact 253 of relay 6Z and the immediate illumination of the indicator 6LK upon the closure of front contact 254 of relay 6Z.

Also, the operation of the relay 6Z closes an energizing circuit for the indicator 6CL even prior to the deenergization of the relay 6WPP. This energizing circuit is closed from (+), through a circuit including polar contact 255 of relay 6Z in a left hand position, polar contact 256 of relay 6WPP in a right hand position, front contact 252 of relay 6WPP, lamp indicator 6CL, to (—).

When the track switch 6TS is in its reverse locked position, polar contact 249 of relay 6WP applies potential from (B—) to the control circuit for relay 6WPP. This actuates the polar contacts of relay 6WPP to the left into correspondence with the polar contacts of the relay 6Z and picks up the neutral contacts of the relay 6WPP. With polar contacts 255 of relay 6Z and polar contact 256 of relay 6WPP in corresponding positions and front contact 252 of relay 6WPP closed, the correspondence indicator 6CL is unilluminated, advising the operator that the track switch 6TS has completed its operation into correspondence with the control established through the operation of the entrance button 101EB and exit button 50WXB.

When the track switch 6TS is in its reverse position, as indicated by the relay 6WPP, the polar contact 243 is in its left hand position so that the energization of the relay 6WZ over the line 226 continues while the switch is still unlocked by relay 6L, but does not include the front contact 242 of relay 6LP.

*Signal control.*—Since the track switch 6TS is in its reverse position as indicated by the relay 6WPP, a signal control is transmitted from the route relay 50—101 to the signal control relay 101GZ in the field. This signal control circuit (see Fig. 6) is closed from (B+), through a circuit including front contact 257 of relay 50—101 and polar contact 258 of relay 50—101 in a left hand position, polar contact 259 of relay 6WPP in a left hand position, line wire 239 to the relay 101GZ (see Fig. 7B), back contact 260 of relay 101RR, to the common return line (CN). The response of the relay 101GZ to this energization closes its front contact 261 so as to complete a stick circuit to render the relay 101GZ independent of the energization of the relay 101RR as presently to be described.

This line circuit control of relay 101GZ by relay 50—101 has also been shown in Fig. 5.

The energization of the relay 101GZ prepares a circuit at contact 218 (see Fig. 5) for energizing the relay 101G for clearing the signal 101, but before such signal clearing can be consummated, the route must be locked and an interlock must determine that an opposing signal is not already cleared.

*Route locking.*—With reference to Figs. 8A and 8B it will be seen that the relays G, one for each of the signals of Fig. 1, are shown in block form at the left of Fig. 8A and at the right of Fig. 8B. Associated with each of the relays G is the respective signal controlling relay GZ. Along the top of Fig. 8A are only those correspondence repeating relays NCR and RCR for the respective track switches which are particularly required for the selection of the route locking circuits; and similarly along the top of Fig. 8B are the track relays for the various track sections shown in Fig. 1.

The route locking herein disclosed is of the directional rear releasing type, that is, the clearing of a signal for a particular direction and the acceptance of such signal by a train causes that route to continue to be locked in advance of a train irrespective of the putting to stop of such signal for that route, but as soon as the train passes beyond the individual track sections of that route such sections are immediately released for use in other routes even before the train has entirely passed from such route. This type of route locking requires an east stick relay ES and a west stick relay WS for each of the track sections, or the equivalent of such relays where in certain cases suitable selections may be made and some of the relays eliminated, and a lock relay L for each of the track switches.

The directional stick relays ES and WS together with the lock relays L are normally energized through circuits readily apparent from the drawings, but in order to make the description entirely clear, with regard to the operation of the system, the operation of these directional stick relays will be pointed out in detail with regard to the track section 9T, it being understood that similar operation occurs with regard to the other track sections and that reference may be made to the above mentioned Patent No. 2,125,242 of Larry and Langdon, for various other conventional operations of such a system.

The directional stick relay 9ES is normally energized by a circuit closed from (+), through a circuit including back contact 372 of relay 50EG, back contact 373 of relay 50ECG, back contact 374 of relay 50EGZ, front contact 375 of relay 9T, in multiple with the stick contact 376 of relay 9ES, windings of relay 9ES, to (—).

The directional stick relay 9WS is normally energized by a circuit closed from (+), through a circuit including back contact 377 of relay 101G, back contact 378 of relay 101GZ, back contact 379 of relay 90G, back contact 380 of relay 90GZ, front contact 381 of relay 9T in multiple with stick contact 382 of relay 9WS, windings of relay 9WS, to (—). The lock relay 6L for the switch 6TS is normally energized from (+), through a circuit including front contact 383 of relay 9WS, front contact 384 of track relay 9T, front contact 385 of relay 9ES, windings of relay 6L, to (—).

The transmission of a signal control to the field location by the energization of the relay 101GZ, as above described (see Figs. 6 and 7B), causes the deenergization of the directional stick relay 9WS at back contact 378 of relay 101GZ (see Fig. 8B) which in dropping deenergizes the lock relay 6L at open front contact 383 so that the track switch 6TS is locked against operation immediately upon the transmission of the signal control. Also, the track switch is continued to be held locked by the clearing of the signal, presently to be described, by reason of open contact 377 of relay 101G irrespective of the signal control. In other words, the signal control received at the field location first causes the track switch to be locked, but the clearing of the signal maintains the track switch locked until the signal is actually returned to stop.

This locking of the track switch 6TS upon the dropping of the lock relay 6L causes the switch control relay 6WZ to be maintained energized by the closure of a readily apparent stick circuit including back contacts 244 and 245 of relay 6L, and polar contacts 268 and 269 of relay 6WZ. The polar contacts 268 and 269 supply energy to the stick circuit in accordance with the last position to which they are actuated, so that the relay 6WZ is maintained energized in its last actuated position.

The opening of front contacts 244 and 245 of relay 6L prevents further control over the line wire 226 and also deenergizes the relay 6LP in the office. This deenergization of the lock repeating relay 6LP not only closes its back contact 278 to continue the energization of the lock indicator 6LK irrespective of the deenergization of the relay 6Z, but also effects what has been termed "the lever lock equivalent," that is, should the relay 6Z be operated to a new position while the track switch 6TS is locked, the relay 6Z must be restored into correspondence with relay 6WPP before the relay 6LP can be picked up to allow the transmission of a new control to the relay 6WZ. This lever lock equivalent feature has been shown and described in the prior patent of R. M. Phinney, Patent No. 2,009,187, dated July 23, 1935, but the distinct cooperation of such a type control with the system of the present invention will be pointed out hereinafter after a further detailed discussion of the manner in which routes may be set up.

It may be noted that the presence of a train on the track section including relay 9T holds the track switch 6TS locked irrespective of the return of the signal 101 to a stop indication. This is because the initial deenergization of the relay 9WS opens front contact 382 so that the presence of a train opening front contact 381 of relay 9T prevents the closure of a pick up circuit for the relay 9WS even though contact 378 becomes closed. It might also be noted in this connection that the presence of a train on the track section 9T does not deenergize the relay 9ES because its front contact 376 shunts out the front contact 375 of relay 9T. In other words, when a route is cleared in one direction the directional stick relays for that direction, tumble down, so to speak, while the directional stick relays for the opposite direction remain picked up.

*Signal interlock.*—The energization of the relay 101GZ opens its back contact 378 so as to deenergize the lock relay 6L for the track switch 6TS. The deenergization of the relay 6L prevents further operation of the switch control relay 6WZ (see Fig. 5) so as to insure that the track switch 6TS will be maintained in its then position.

The deenergization of the lock relay 6L also closes the signal interlocking circuits shown in Figs. 7A and 7B with regard to the route under consideration. Thus, as soon as the lock relay 6L is deenergized, a circuit is closed for the energization of the relays 50ERR and 101RR in series. This circuit is closed from (+), through a circuit including front contact 262 of relay 101GZ, windings of relay 101RR, front contact 263 of relay 6RCR, back contact 264 of relay 6L, windings of relay 50ERR, back contact 265 of relay 50EGZ, wire 272, back contact 273 of delay 50WRR, to (—). The closure of this circuit immediately causes the contacts of the relays 50ERR and 101RR to be picked up, and the opening of back contact 266 included in the pick up circuit of relay 50EGZ positively prevents the signal 50E for the opposite direction from being cleared.

The contemporaneous energization of the relays 101GZ and 101RR closes an obvious energizing circuit for the relay 101G through front contacts 218 and 219 (see Fig. 5). The opening of back contact 217 and the closure of front contact 217 of relay 101G clears the signal 101 so that the train may proceed over the trackway up to the signal 50W. In other words, the route from H to K is cleared.

It may be noted here in connection with the signal interlock (see Figs. 7A and 7B) that the energizing circuit for the relays 101RR and 50ERR includes back contact 273 of relay 50WRR, so that if any signal, such as 30, were cleared for allowing the passage of a train up to the point K, the clearing of the signal 101 would be impossible. Upon the energization of the relay 50ERR, its front contact 274 shunts out the back contact 273 so that the signal 50W may be cleared involving the energization of the relay 50WRR without interrupting the cleared signal 101, in a manner presently to be described.

It is to be noted that the operation of such interlocking circuits has been shown and described in detail in the patent to A. Langdon, Patent No. 2,149,222 dated February 28, 1939, and it is also to be understood that various other features shown in such application in connection with such circuits, may also be employed with the circuits herein disclosed or substituted therefor insofar as they are in harmony with the operation of the system disclosed, without in any way extending beyond the contemplated scope of the present invention.

*Indications.*—It may be well to review at this time in connection with Fig. 2, the indications displayed to the operator upon the establishment of this route.

When the operator contemplated establishing a route from H to K, he noted that the lock indicator 6LK was unilluminated so that it was perfectly permissible to set up the contemplated route. Immediately following the actuation of the entrance button 101EB and exit button 50WXB, the miniature track switch point 6TS is operated to its reverse position and the lock indicator 6LK is illuminated by reason of the closure of front contact 254 of relay 6Z, as previously described (see Fig. 5).

The fact that the track switch 6TS in the field requires operation before the route can be set up as indicated by the miniature track switch 6TS, is indicated by the illumination of indicator 6CL, which occurs immediately upon the operation of the relay 6Z and continues so long as the track switch is out of correspondence, or is unlocked as indicated by the relay 6WPP in the office.

Upon the completion of the reverse operation of the track switch 6TS into correspondence with its control as set up in the relay 6Z and as indicated by the miniature track switch point 6ts, the indicator 6CL is unilluminated, so that the operator then knows that the route is physically set up.

The next indication to be received is the illumination of the signal indicator 101SK which advises that the signal for such route has been cleared. The indicators SK are in the center of the entrance knobs as shown in Fig. 2, with lamps as shown for 101SK in Fig. 5. The energization of this indicator is accomplished by the closure of contact 267 of relay 101GR, which is energized by a circuit closed from (B+), through a circuit including front contact 275 of relay 101G, line wire 228, windings of relay 101GR, to the common return line (CN).

*Passage of train.*—Let us assume that the train now passes onto the track section 9T in acceptance of the signal 101 and passes over the track switch 6TS up to the signal 50W (see Fig. 1). The deenergization of the track relay 9T (see Figs. 1 and 5), causes the deenergization of the relay 9TP in the central office by reason of open contact 251. Also, the lock relay 6L is maintained deenergized by reason of open front contacts 381 and 384 of relay 9T (see Fig. 8B).

With the relay 9TP deenergized, an energizing circuit is closed for the indicator 9TK (see Figs. 2 and 5) through a circuit closed from (+), through a circuit including back contact 276 of relay 9TP, lamp of indicator 9TK, to (−).

The illumination of the indicator 9TK advises the operator that the train has accepted the signal 101 and that such signal may now be returned to stop by manual control or left clear for a following train. Usually in practice automatic control is provided for such signals so that the passage of a train will cause the signal to be automatically put to stop as shown for signal 2 in the above mentioned Patent No. 2,125,242, but such control has not been shown for the sake of simplicity in the present disclosure. Also, the signals may be made stick signals as shown for signal 1 in such application.

The manual return of the signal is accomplished by rotating the entrance button 101EB clockwise to its normal position, which deenergizes its relay 101R and which in turn deenergizes the route relay 50—101. This route relay 50—101 under such conditions is wholly dependent upon the relay 101R. Also, all of the various relays dependent upon relay 50—101 are deenergized. The closure of back contact 378 of relay 101GZ does not reenergize the lock relay 6L, because the track relay 9T is still deenergized due to the presence of the train.

The deenergization of the relay 6Z does not deenergize the lock indicator 6LK, because with the lock relay 6L still deenergized, the relay 6LP remains deenergized closing back contact 278 which also supplies energy to the indicator 6LK. The deenergization of relay 101G opens front contact 275 which is repeated by relay 101GR so that the signal indicator 101SK is caused to be unilluminated advising the operator that the stop control of the signal has been accomplished.

*Optional route establishment.*—As the train is now in approach to the signal 50W, the operator may route such train to any of the desired points in the interlocking plant such as A, B and C, but for the purpose of bringing out the automatic selection of a particular route by the system of the present invention from a plurality of optional routes, let us assume that the operator desires the passage of the train from K to B.

The operator rotates the entrance button 50EB counterclockwise and actuates the exit button 20XB. The closure of contacts 222 and 223 energizes the relay 50WR which together with the contemporaneous actuation of the exit button 20XB causes the energization of the route relay for the particular optional route predetermined or chosen as the superior route.

It will be seen from Fig. 1, that a train could pass to the point B from K by way of the track switch 3TS or by the way of the track switch 1TS. Either of these routes might be chosen as the preferred route, but in accordance with the embodiment of the present invention, the route via the track switch 3TS has been chosen as the superior route so that upon the actuation of the entrance button 50EB and the exit button 20XB, the route circuits in Fig. 3A automatically cause the ultimate selection and energization of the relay 20—50 via 3TS.

Upon the actuation of the entrance button 50EB and the exit button 20XB, both the relays 20—50 via 3TS and 20—50 via 1TS have energizing circuits which are closed simultaneously. The energizing circuit for 20—50 via 3TS is closed from (+) through a circuit including front contact 279 of relay 50WR, back contact 280 of slow acting relay 20—50SEL, back contact 281 of relay 30—50, back contact 282 of relay 20—60, windings of relay 20—50 via 3TS, back contact 283 of relay 10—50, back contact 284 of relay 20—40, back contact 285 of relay 10—40, back contact 286 of relay 10—40S, back contact 287 of relay 20R, back contact of exit button 20XB, to (—).

The energizing circuit for relay 20—50 via 1TS is closed from (+), through a circuit including front contact 279 of relay 50WR, back contact 288 of relay 30—60, back contact 289 of relay 30—50, back contact 290 of relay 20—60, windings of relay 20—50 via 1TS, back contact 291 of relay 20—50 via 3TS, back contact 292 of relay 10—50, back contact 293 of relay 20—40, back contact 287 of relay 20R, back contact of exit button 20XB, to (—).

It is noted that both of these relays 20—50 via 3TS and 20—50 via 1TS are energized at the same time so that their contacts may well pick up simultaneously, but the opening of back contact 291 of relay 20—50 via 3TS opens the energizing circuit for 20—50 via 1TS so that it becomes deenergized and the relay 20—50 via 3TS is the one which is thereby selected. However, provision is made so that should the relay 20—50 via 1TS for some reason continue to be picked up for a predetermined time, the relay 20—50 via 3TS will be deenergized at back contact 280 of the slow acting selecting relay 20—50SEL by reason of its energization at front contact 294 of relay 20—50 via 1TS. This arrangement also provides an interlock between these two relays so that if the route over track switch 1TS is manually set up, as will be described later, then the route over 3TS cannot possibly be completed by reason of open back contact 280 of relay 20—50SEL.

It also may be noted that the preferred route may readily be made the route over the track switch 1TS by merely changing this interlock, namely, place a back contact of the relay 20—50 via 1TS in the pick up circuit for the relay 20—50 via 3TS, remove contact 291, cause the relay 20—50SEL to be energized by a front contact on relay 20—50 via 3TS, and place the back contact 280 in the pick up circuit for the relay 20—50 via 1TS.

Upon the flow of energy through the windings of relay 20—50 via 3TS its polar contacts are actuated to the left and its neutral contacts are picked up so that energy is applied from (—), through front contact 295 and polar contact 296 in a left hand position to the heel of contact 286 of relay 10—40S so that the release of the exit button 20XB renders the relay 20—50 via 3TS wholly dependent upon the entrance button 50EB.

The energization of the route relay 20—50 via 3TS causes the operation of all the track switches associated with this route thus automatically selected. With reference to Fig. 4A, the closure of front contact 297 energizes the normal operating winding N of relay 1Z; the closure of front contact 298 energizes the normal operating winding N of the relay 2Z; the closure of front contact 299 energizes the reverse winding R of the relay 3Z; and the closure of front contact 300 energizes the reverse operating winding R of the relay 4Z. Each of these relays 1Z, 2Z, 3Z and 4Z operate their respective track switches 1TS, 2TS, 3TS and 4TS in accordance with the normal or reverse positions of such relays Z in a manner as above described in connection with the relay 6Z and the track switch 6TS more specifically shown in Fig. 5. It is also to be understood that various features of operation described hereinafter in connection with the control of track switch 6TS are to be considered as also applicable to the control of the remaining track switches.

It is noted from Fig. 1 that the track switches 1TS, 2TS and 3TS are directly involved in the route under consideration from K to B, while the track switch 4TS is operated to a reverse position to give what is termed derail protection for this route. In other words, if a train were to run past the signal 30 at stop, it could not reach the clear route from K to B because the track switch 4TS would be reversed and such train would be side-tracked toward D. Thus, it is seen that derail protection is given a route automatically upon the setting up of that route without the operator being required to choose under any circumstances the particular switches which are to thus act. This is a distinct advantage over the usual type interlocking system where individual manual control is required for each of the track switches, inasmuch as in such a system the operator would be required to learn which track switches were to be operated to give this derail protection and each time he set up a route he would be required to individually control such switches.

The energization of the relays 1Z, 2Z, 3Z and 4Z causes the lock indicators 1LKa, 1LKb, 2LK, 3LKa, 3lKb and 4LK to be illuminated in a manner directly analogous to that described in connection with the illumination of the indicator 6LK specifically shown in Fig. 5. Also, the miniature track switch points 1ts and 2ts are caused to assume their normal positions and the miniature track switch points 3ts and 4ts are caused to assume their reverse positions as described in connection with Fig. 5 for the miniature track switch point 6ts.

During the lack of correspondence between the track switches 1TS, 2TS, 3TS and 4TS and their control as set up on the panel, the indicators 1CL, 2CL, 3CL and 4CL will of course be illuminated as described in connection with the illumination of the indicator 6CL for the track switch 6TS.

Following the operation of the track switches to their proper positions, and the indication of such proper conditions in the control office by their respective relays WPP, a signal control is transmitted to the field for clearing the signal 50W. This signal control circuit is closed from (B+), through a circuit including front contact 301 of relay 20—50 via 3TS (see Fig. 6), polar contact 302 of relay 20—50 via 3TS in a left hand position, polar contact 303 of relay 1WPP in a right hand position, polar contact 304 of relay 2WPP in a right hand position, polar contact 305 of relay 3WPP in a left hand position, wire 233 to the relay 50WGZ (see Fig. 7A), windings of relay 50WGZ, back contact 306 of relay 50WRR, to the common return line (CN). As soon as the relay 50WGZ responds, it closes its front contact 307 to render it independent of contact 306 of the relay 50WRR.

The picking up of the contacts of the relay 50WGZ also deenergizes the lock relays 1L, 2L and 3L in a manner analogous to that described in connection with the lock relay 6L. More specifically, the picking up of relay 50WGZ opens the energizing circuit for relay 5WS at back contact 386 which in turn deenergizes the relay 4WS by the opening of its front contact 387 because at this time the track switch 3TS is in a reverse position opening front contact 388 of relay 3NCR. The deenergization of the relay 4WS opens the energizing circuit for the relay 2WS at front contact 389.

The deenergization of relay 5WS opens the energizing circuit of lock relay 3L at front contact 390; the deenergization of relay 4WS opens the energizing circuit of relay 2L at front contact 391; and the deenergization of relay 2WS opens the energizing circuit for relay 1L at front contact 392. This dropping of the lock relays L for each of the track switches in the route prevents control of their respective track switches as described in connection with the track switch 6TS in Fig. 5, and also prepares the interlocking circuits for the signals in Figs. 7A and 7B.

The energization of the relay 50WGZ can now close an energizing circuit for the relays 50WRR and 20RR by a circuit closed from (+), through a circuit including front contact 308 of relay 50WGZ, windings of relay 50WRR, back contact 309 of relay 3L, front contact 310 of relay 3RCR, back contact 311 of relay 2L, front contact 312 of relay 2NCR, front contact 313 of relay 1NCR, back contact 314 of relay 1L, windings of relay 20RR, back contact 315 of relay 20GZ, to (−).

It will be noted that the track switch 4TS does not have any selections for the route made through it, that is, the circuit for the relay 50WGZ does not include contacts of the relay 4WPP nor does the circuit for the relays 20RR and 50WRR have contacts of the relays 4NCR and 4RCR, although it should be understood that such selections may be made if desired.

The picking up of the contacts of relay 50WRR opens back contact 306, and the picking up of the contacts of relay 20RR opens back contact 316 so that the signal 20 cannot possibly be cleared.

The contemporaneous energization of the relays 50WRR and 50WGZ causes the clearing of the signal 50W in a manner directly analogous to the control illustrated for the signal 101 in Fig. 5.

The train accepts the signal 50W and passes from K to B over the track sections including the track relays 5T, 4T and 2T which cause the lock relays L for the track switches 3TS, 2TS and 1TS to be positively locked during such passage of the train, and also causes the illumination of the track indicators 5TK, 4TK and 2TK successively. The train may then pass out of the interlocking plant, or into other sections of the plant, as the case may be.

As soon as the train accepts the signal 50W as indicated by the illumination of the track indicator 5TK, the operator may rotate the entrance button 50EB clockwise to its normal position to manually place the signal 50W at stop which is indicated to the operator by the unillumination of the indicator 50SK. Although the route relay 20—50 via 3TS is deenergized and the signal 50W is at stop, the lock indicator LK for each of the respective switches will be illuminated until the train has passed beyond each respective track section in which such track swtches are located. Upon the passage of the train, the lock indicator LK for a switch and the track indicator TK for the track section associated with that switch will become simultaneously unilluminated. The indicators LK are thus maintained illuminated in advance of a train because the presence of a train on any track section maintains all of the directional stick relays for that route in that direction deenergized, as will be apparent from consideration of Figs. 8A and 8B. But upon the passage of a train beyond a track section, the lock relay for that section is immediately picked up so that the lock indicator LK becomes unilluminated and of course the track occupancy indicator TK also becomes unilluminated at the same time.

The optional route control just described involves the automatic setting up of the predetermined superior route whenever that route is capable of being set up, but it may happen that the preferred route is in conflict with another route which has a train passing over it so that the secondary optional route is the one which must be automatically set up. As such automatic operation involves either a cleared conflicting route or the presence of a train on such conflicting route it is thought advisable to point out the passage of a train through certain routes involving such a conflicting route before considering the automatic selection of a secondary optional route.

The system of the present invention also provides that the operator may manually determine that the secondary optional route be set up, but as such operation involves the operation of an emergency switch machine control lever SML which is to be described in connection with the electric lock equivalent involved in the control of the track switches as specifically shown in Fig. 5 with respect to the relays 6Z, 6WZ, 6L and 6LP, such manual selection of the secondary optional route will be described following the description of the electric lock equivalent feature of the system.

*Single intermediate signal control.*—With reference to Fig. 1, it will be seen that only the signal 40 is located at the point J on the main track between B and F. The system of the present invention provides that the clearing of either the signal 10 or the signal 20 will allow the passage of a train from the points A and B to F in an east bound direction, but when a train is to pass in a west bound direction from F to the points A or B, the signal 40 must be cleared to let such traffic pass.

Let us assume that a train is standing in advance of the signal 10 and that the operator desires this train to pass from the point A to the point F. To do this, he rotates the entrance button 10EB clockwise and then directs his attention along the trackway to ascertain that there are no track switches included in the route which are in the wrong positions for such route with their lock indicators LK illuminated. Providing the track switches are in proper positions and locked, proper positions and unlocked or improper positions and unlocked, the operator then depresses the exit button 80XB.

The actuation of the entrance button 10EB causes the energization of the relay 10R and the contemporaneous actuation of the relay 10R with the actuation of the exit button 80XB causes the route relay 10—40 to be energized by a circuit closed from (+), through a circuit including front contact 317 of relay 10R (see Fig. 3A), windings of relay 10—40, back contact 318 of relay 20—40, back contact 319 of relay 10—50, back contact 320 of relay 20—50, via 3TS, back contact 321 of relay 40R, wire 322, back contact 323 of relay 70—80 (see Fig. 3B), back contact 324 of relay 80R, back contact of exit button 80XB, to (—). The energy which flows in this circuit causes the contacts of the relay 10—40 to respond closing front contact 325 and polar contact 326 to the right which applies negative potential from (—) to the heel of contact 321 so that the relay 10—40 is then wholly dependent upon entrance button 10EB and independent of anything included in wire 322 to the right of contact 321.

The picking up of the contacts of the relay 10—40 also closes an energizing circuit for the relay 40—80 from (+), through a circuit including polar contact 327 of relay 10—40 in a right hand position, front contact 328 of relay 10—40, back contact 329 of relay 20—40, wire 330, windings of relay 40—80, back contact 331 of relay 70—80, back contact 332 of relay 80R, back contact of exit button 80XB, to (—). The response of the relay 40—80 closes front contact 333 and polar contact 334 to its right hand position to apply negative potential to the heel of contact 332 so that upon the release of the exit button 80XB by the operator, the relay 40—80 remains energized dependent upon the relay 10—40.

The picking up of the route relay 10—40 prevents the picking up of any conflicting route relay involving the track switch 2TS such as the route from K to B, the route from B to F, and the like, while the picking up of the route relay 40—80 prevents the establishment of a route from E to F or from F to E should the operator forget that he had cleared a route from A to F.

The energization of the route relays 10—40 and 40—80 causes the proper controls to be transmitted to the track switches involved in this route from A to F. More specifically, with reference to Fig. 4A, an energizing circiut is closed for the relay 2Z from (+), through a circuit including front contact 335 of relay 10—40, reverse control bus for relay 2Z, contacts of emergency switch control lever 2SML as represented by the dotted rectangle 2E, lower reverse operating winding R of relay 2Z, to (—).

An energizing circuit is also closed for the switch control relay 3Z from (+), through a circuit including front contact 336 of relay 10—40, normal operating bus for relay 3Z, contacts of emergency switch lever 3SML as represented by the dotted rectangle 3E, normal operating winding N of relay 3Z, to (—).

The energization of the route relay 40—80 closes an energizing circuit for the switch control relay 5Z from (+), through a circuit including front contact 337 of relay 40—80, normal control bus for relay 5Z, contacts of the emergency switch control lever 5SML as represented by the dotted rectangle 5E, normal operating winding N of relay 5Z, to (—).

The energization of the switch control relays 2Z, 3Z and 5Z causes the operation of the switch machines 2SM, 3SM and 5SM to operate their respective track switches to proper positions, as will be understood by analogy to the operation described in connection with the track switch 6TS. The operation of the track switch 2TS to a reverse position deenergizes its correspondence relays 2NCR and 2RCR during such operation as well as the switch position repeating relay 2WPP in the central office. Assuming that the track switch 3TS also is required to be operated, its relays 3NCR and 3RCR are also deenergized as well as its switch position repeating relay 3WPP in the central office. Assuming that the track switch 5TS does not require operation, its relay 5NCR is maintained energized and its relay 5WPP in the central office gives the proper indication. After the track switches 2TS and 3TS are locked in their reverse and normal positions respectively, then their respective relays 2RCR and 3NCR are energized, and the reverse and normal positions are respectively indicated by their relays 2WPP and 3WPP. This operation is of course all analogous to the operation pointed out in connection with the track switch 6TS shown in detail in Fig. 5 and the completion of the physical route from A to F provides for the transmission of the signal control and the establishment of the signal interlocking circuits in the field, as will presently be described.

Following the operation of the track switches to their proper positions and the indication of such positions repeated in the control office by their respective relays WPP, a signal control circuit is closed for the relay 10GZ from (B+), through a circuit including front contact 338 of route relay 10—40 (see Fig. 6), polar contact 339, of route relay 10—40 in a right hand position, polar contact 340 of relay 3WPP in a right hand position, polar contact 341 of relay 2WPP in a left hand position, polar contact 345 of relay 5WPP in a right hand position, wire 229, windings of relay 10GZ (see Fig. 7A), back contact 342 of relay 10RR, back contact 343 of relay 10XRR, to the common return line (CN).

As soon as the relay 10GZ responds to such energization, a connection to the common return line (CN) is made through front contact 344 so as to render the relay 10GZ independent of the back contacts 342 and 343 of relays 10RR and 10XRR.

*Lock circuits.*—The transmission of the signal control to the relay 10GZ, above described in connection with Figs. 6 and 7A, causes the locking of the route by reason of the opening of its back contact 394 in Fig. 8A. This opening of back contact 394 of relay 10GZ deenergizes the normally energized directional stick relay 4ES, which in turn deenergizes the directional stick relay 8ES at open front contact 395. The deenergization of the relay 4ES opens the normally closed energizing circuit for the lock relays 2L and 3L at contact 396. The deenergization of the directional stick relay 8ES deenergizes the lock relay 5L at front contact 398. The deenergization of the lock relays 2L, 3L and 5L prevents further control of these track switches by opening the control circuits for their respective WZ relays (not shown) and by causing such relays to be stuck-up, as described in connection with the relay 6WZ in Fig. 5 for the track switch 6TS.

*Signal interlocking circuits.*—Upon the dropping of the lock relays 2L and 3L, an interlocking circuit is closed for energizing the relays 10RR and 40RR in series (see Figs. 7A and 7B) from (+), through front contact 357 of relay 10GZ, windings of relay 10RR, front contact 358 of relay 2RCR, back contact 311 of relay 2L, front contact 359 of relay 3NCR, back contact 360 of relay 3L, windings of relay 40RR, back contact 361 of relay 40GZ, to (—). The relay 10RR in picking up opens its back contact 342, while the relay 40RR in picking up opens its back contacts 362, thereby completing the interlock for the opposite directions insofar as the signals 10 and 40 are concerned.

The energization of relay 10GZ also closes an interlocking circuit for the relays 10XRR and 80RR from (+), through a circuit including front contact 363 of relay 10GZ (see Fig. 7A), windings of relay 10XRR, front contact 364 of relay 2RCR, back contact 365 of relay 2NCR, front contact 366 of relay 3NCR, wire 367, front contact 368 of relay 5NCR, (see Fig. 7B), back contact 369 of relay 5L, winding of relay 80RR, back contact 370 of relay 80GZ, to (—). The picking up of relay 10XRR opens its back contact 343, while the picking up of relay 80RR opens its back contact 371, thereby completing the interlock between signals 10 and 80.

With the relays 10GZ, 10RR and 10XRR all energized, the signal control relay 10G (see Fig. 8A) is energized by a circuit including a front contact of relay 10XRR, a front contact of relay 10RR, and front contact of relay 10GZ.

This energizing circuit for the signal relay 10G is directly analogous to the circuit for the relay 101G specifically shown in Fig. 5, except it includes a front contact of the relay 10XRR. In other words, each signal control relay G always includes a front contact of its respective GZ relay, its respective RR relay and also a front contact of its respective XRR relay providing there is one. Thus, it will be apparent that the signal relay 20G similarly has front contacts on relays 20GZ, 20RR and 20XRR included in its pick up circuit. It should be noted in this connection that these circuits for the relays G have been shown as providing no automatic rear end protection for the trains, but such protection might be added, if desired, in accordance with the usual practices as shown for example in the above mentioned Patent No. 2,125,242 dated July 26, 1938, but it is believed sufficient for an understanding of the present invention to know how these signals are cleared dependent upon the control provided by the system of the present invention. The energization of the relay 10G opens its back contact 393 so that the lock relays 2L, 3L and 5L are maintained deenergized while such route from A to F is cleared. Also, the energization of the relay 10G clears the signal 10 in a manner directly analogous to the control of signal 101 by the relay 101G described in connection with Fig. 5.

With reference to Fig. 2, the indications displayed to the operator may be noted. More specifically, with the track switches 2TS, 3TS and 5TS in locked condition, their respective lock indicators 2LK, 3LKa—3LKb, and 5LK will be illuminated. Also, with the signal 10 cleared, the signal relay 10G controls an indicating relay 10GR (not shown but analogous to relay 101GR of Fig. 5) which causes the indicator 10SK to be illuminated advising the operator that the route is set up and that the train may accept the signal.

The train may now proceed over the trackway from A to F and in passing over the track sections causes the respective track relays to be deenergized each of which has a contact included in the circuit for the lock relays associated with the respective switches. For example, the lock relays 2L and 3L for the track switches 2TS and 3TS have front contact 354 of the track relay 4T in their circuits; while the track relay 8T has a front contact 399 in the circuit for lock relay 5L.

As soon as the train accepts the signal 10, such acceptance will be indicated to the operator by the illumination of the track indicator 4TK (see Fig. 2) so that the operator may restore the entrance button 10EB any time thereafter that he desires preferably before another train arrives at the point A unless he desires such train to follow the train just considered as passing through the route from A to F. Also, the passage of the train through the route causes the track indicator 8TK to be illuminated as soon as the train passes onto the associated track section. The presence of this train upon the route from A to F also causes the lock lights such as 2LK, 3LKa—3LKb and 5LK to remain illuminated irrespective of the restoration of the entrance button 10EB deenergizing the respective relays Z, as it is to be understood that each of the lock relays have back contacts in multiple with the contacts on the respective relays Z which control the lock indicators LK, as described for the indicator 6LK of Fig. 5.

The passage of the train beyond the point J causes the unillumination of the track indicator 4TK and releases the locking for the track switches 2TS and 3TS provided the entrance button 10EB has been restored to its normal stop position, but track switch 5TS remains locked. This rear releasing of the route is because the energization of the track relay 4T closes the pickup circuit for the directional stick relay 4ES (see Figs. 8A and 8B) from (+), through a circuit including back contact 393 of signal relay 10G, back contact 394 of signal control relay 10GZ, wire 400, front contact 401 of relay 2ES, front contact 402 of relay 4T, windings of relay 4ES, to (—). The picking up of this relay 4ES closes its stick contact 403 to shunt out the track relay contact 402. The picking up of the relay 4ES also closes the energizing circuit for the lock relays 2L and 3L from (+), through a circuit including front contact 396 of relay 4ES, front contact 354 of relay 4T, wire 404, front contact 391 of relay 4WS, windings of relay 2L, to (—); and also from the heel of contact 391, through front contact 390 of relay 5WS, wire 405, front contact 406 of relay 5T, front contact 407 of relay 5ES, windings of relay 3L, to (—). Thus, the pick up of these lock relays 2L and 3L releases the track switches 2TS and 3TS for operation which is indicated by the unillumination of the respective indicators LK on the control panel of Fig. 2.

However, the track switch 5TS remains locked due to the de-energized condition of the track relay 8T which holds the directional stick relay 8ES de-energized at open front contact 408 as well as maintaining the lock relay 5L de-energized by reason of open contact 399.

As the train passes beyond the track section including the track relay 8T, such information is given to the operator by the unillumination of the track indicator 8TK, and the track switch 5TS, is unlocked by the picking up of the lock relay 5L, which will readily be understood by analogy to the above description.

The operation of the locking circuits shown in Figs. 8A and 8B as associated with a system of the type herein disclosed, have the feature that the clearing of a route requiring the operation of a track switch such as 3TS from a reverse position to a normal position does not cause the de-energization of lock relays of switches not in the route to be cleared, as might be the case during the operation of a track switch in certain other locking systems previously known. The reason for this is that the signal control to the relay 10GZ, for example, is not transmitted to such relay until the route has been physically set up, which delayed control is accomplished by reason of the selections through contacts of the relays WPP shown in Fig. 6. This feature will be described more in detail hereinafter.

*Inferior route automatically cleared.*—The clearing of the route from A to F for the passage of a train through that route including the track section 4T, is automatically operative to cause the selection of an inferior optional route from the point K to the point B.

Let us assume that the operator has operated the entrance button 10EB and the exit button 80XB thereby causing the energization of the route relays 10—40 and 40—80, as above described. The picking up of the route relay 10—40 closes a pick-up circuit for the stick relay 10—40S (see Fig. 3A) from (+), through a circuit including front contact 411, windings of relay 10—40S, to (—). With the relay 10—40S picked up, it is apparent that if the operator rotates the entrance button 50EB counter clockwise and depresses the exit button 20XB that the route relay 20—50 via 3TS cannot be energized by reason of open back contact 286 of relay 10—40S. Thus, the route relay 20—50 via ITS will be immediately picked up through the pick up circuit previously pointed out and will close its stick circuit from (—), through front contact 412 and polar contact 413 in a left hand position so as to maintain the route relay 20—50 via ITS picked up when the exit button 20XB is released.

The picking up of the route relay 20—50 via ITS also closes the energizing circuit for the repeating relay 20—50 SEL at front contact 294. Thus, the back contact 280 of relay 20—50 SEL is opened so that the route relay 20—50 via 3TS cannot be energized although the route relay 10—40 is de-energized and the route from A to J becomes unoccupied. This condition continues so long as the route relay 20—50 via ITS is maintained energized dependent upon the entrance button 20EB.

The route relay 20—50 via ITS will likewise be selected even though the route relay 10—40 is de-energized and front contact 411 is opened, if the signal 10 has once been cleared and a train still remains on the track section 4T. This is because the relay 10—40S has a stick circuit which is closed while the train is on the track section 4T. Such occupancy of the track section 4T causes the lock relay 2L to be de-energized by reason of the open contact 354, which relay 2L with the track switch 2TS in a reverse position closes a stick circuit for relay 10—40S from (+), through a circuit including polar contact 414 of relay 2WPP in a left hand position, back contact 415 of relay 2LP, front contact 416 of relay 10—40S, windings of relay 10—40S, to (—).

The energization of the route relay 20—50 via ITS closes its contacts 417, 418, 419 and 420 to cause the track switches ITS, 2TS, 3TS and 4TS to assume reverse, reverse, normal and normal positions respectively, as will be readily appreciated by consideration of Fig. 4A. After the operation of the track switches, a signal control circuit is closed for the relay 50WGZ (see Fig. 6) from (B+), through a circuit including front contact 421 of relay 20—50 via I, polar contact 422 of relay 20—50 via ITS in a left hand position, polar contact 423 of relay IWPP in a left hand position, polar contact 424 of relay 4WPP in a right hand position, polar contact 305 of relay 3WPP in a right hand position, wire 233 (to Fig. 7A) winding of relay 50WGZ, back contact 306 of relay 50WRR, to the common return (CN).

The energization of this relay 50WGZ accomplishes the clearing of the signal 50W in a manner which will be understood by analogy to the description above given in connection with the control of signal 101.

Thus, an inferior route may be automatically selected when the superior route is either cleared or has been returned to stop but is still occupied by a train. It may be noted, however, that as soon as the train passes beyond the track section 4T, then the lock relay 2L is picked up and the relay 10—40S drops away restoring the system to normal.

*Inferior route manually cleared.*—With reference to Fig. 4A, a rectangle E has been shown in connection with each of the switch control relays Z, which rectangle represents the contacts of a manually operated emergency switch control lever shown in detail for the relay 6Z in Fig. 4B.

Assuming the emergency switch control lever 6SML to be in a central position with the route relay 50—90 picked up, a circuit is closed for the normal winding N of relay 6Z, from (+), through a circuit including front contact 425 of relay 50—90, bus wire 426, contacts 427—428 of emergency 6SML, wire 429, normal winding N of relay 6Z, to (—). This energizes the relay 6Z so as to cause the normal operation of the track switch in a manner described in connection with Fig. 5.

On the other hand, if the route relay 50—101 is picked up with the lever 6SML in a central position, a circuit is closed for energizing the reverse winding R of the relay 6Z, from (+), through a circuit including front contact 240 of relay 50—101, bus wire 430, contacts 431—432 of emergency lever 6SML, wire 433, reverse winding R of relay 6Z, to (—). Such energization of the relay 6Z causes the operation of its polar contacts to reverse left hand positions to cause reverse operation of the track switch 6TS as described in connection with Fig. 5.

It is noted that the contacts 427—428 and 431—432 are normally closed, but if the lever 6SML is depressed downwardly to a normal operating position for the switch 6TS, the contact 428 disengages from contact 427 and engages with contact 434 to apply energy from (+), to the wire 429 to energize the normal winding N of the relay 6Z although the contacts 431—432 remain closed. But if the lever 6SML is moved upwardly to its reverse operating position, the contacts 427—428 continue to be made while the contact 432 disengages the contact 431 and engages the contact 435 to apply energy from (+), to the wire 433 to energize the reverse wiring R of the relay 6Z. Thus, if the route relays 50—90 and 50—101 are deenergized, then the lever 6SML may cause the normal and reverse operation of its associated track switch 6TS by energizing the normal and reverse windings N and R of the relay 6Z.

However, if a route relay such as 50—90 is energized applying energy to the wire 429 through the contacts 427—428, then the operation of the lever 6SML to its reverse position to apply energy to the wire 433 is ineffective to cause operation of the relay 6Z. This is because both the wires 429 and 433 have energy applied thereto so that both windings of the relay 6Z are energized, but as these windings are connected differentially to cause normal and reverse operation of the polar contacts, the currents in these windings neutralize each other and the polar contacts of the relay 6Z remain in their last actuated positions although the neutral contacts do drop away. A similar operation occurs if the route relay 50—101 is picked up and the emergency lever 6SML is manually operated to its normal position.

In other words, if a route relay is picked up to control a track switch, the manual operation of its associated emergency switch control lever SML does not affect that track switch whatsoever, but if that track switch is not included in any route then its relay Z may be manually operated to cause the operation of that track switch as desired.

The emergency switch control lever 6SML has been shown as having added contacts 436 and 437 which may be employed for the operation of route stick relays, such as relay 10—40S of Fig. 3A. In fact, the relay 10—40S is shown as having associated therewith similar contacts 438 and 439 which are located on the emergency switch lever 1SML and are closed when this emergency switch control lever is in its reverse position. This applies energy from (+) to the windings of relay 10—40S to pick it up. Such manual energization of the stick relay 10—40S causes the selection of the route relay 20—50 via 1TS by reason of the opening of its back contact 286 in the event of the actuation of the entrance button 50EB and the exit button 20XB in a manner that will be apparent from a consideration of the automatic selection of this relay. In other words, the manual operation of the track switch 1TS to its reverse position while such switch is not included in any route will cause such switch to be selected in preference to the superior route in the event that the optional routes are to be selected by the operation of their entrance and exit buttons.

It may be desirable to have the contact, such as contacts 438 and 439, operable manually in some other manner so as to be able to manually select the inferior route, but for the purpose of the present disclosure it is thought to be sufficient to point out that such manual operation may be embodied in the emergency switch control levers.

*Modified optional route selection.*—In Fig. 14 a modified arrangement for accomplishing the selection of the optional routes for both the automatic and manual control is shown. This Fig. 14 shows a fragmentary part of Fig. 3A with the same relays and contacts given the same reference characters as in Fig. 3A. The route stick relay 10—40S of Fig. 3A is now a route repeating relay 10—40P because this relay is no longer a stick relay but has the contact 416 of Fig. 3A omitted. It is noted that the circuit connection from the heel of contact 293 instead of going to the bus wire which leads to the heel of contact 287 of relay 20R, now goes through a front point of contact 286 of the route repeating relay 10—40P before it is connected to such bus wire. It is also noted that the relay 20—50SEL of Fig. 3A is entirely omitted but the equivalent of contact 280 on such relay is now contact 502 on relay 20—50 via 1TS.

Also, route relay 20—50 via 3TS is provided with front contact 503 which shunts out contact 286 when this route relay is picked up. Similarly, route relay 20—50 via 1TS is provided with front contact 504 for shunting out contact 286 when this route relay is picked up.

This modified form eliminates the time basis selection between the route relays 20—50 via 1TS and 20—50 via 3TS, and causes the selection to be on a positive basis depending upon whether or not the route repeating relay 10—40P is picked up.

It is believed to be sufficient for an understanding of the advantages of this modification to know that the relay 10—40P repeats the route relay 10—40 and is controlled by contacts 438—439 on lever 1SML the same as in Fig. 3A. The stick circuit for the relay 10—40S in Fig. 3A is replaced by a holding circuit in Fig. 14 which omits the contact 416 but such circuit operates under the same circumstances as the stick circuit in Fig. 3A inasmuch as the relay 10—40P would be initially picked up either by the contact 411 on the route relay 10—40 or by the contacts 438—439 on the lever 1SML. The contact 286 now causes a positive selection between the relays 20—50 via 1TS and 20—50 via 3TS and eliminates the selecting relay 20—50SEL, while the contacts 503 and 504 are effective to eliminate the control of the contact 286 from these route relays once they are picked up. This latter feature provides that a route once established and under the control of the entrance button 20EB cannot be interrupted by the accidental operation of an emergency switch lever, such as lever 1SML. This arrangement provides the same facility of operation in the automatic selection or the manual selection of the optional routes as is provided in Fig. 3A, and is to be understood to operate the same as such Fig. 3A except as noted above.

*Lever lock equivalent.*—With reference to Fig. 5 of the accompanying drawings, it will be seen that the operation of the relay 6Z to a reverse position while the lock relay 6L is deenergized does not apply energy to the relay 6WZ through contact 241 in a left hand position because the contact 244 of relay 6L is open and the contact 242 of relay 6LP is also open. It will be seen from Fig. 4A that such reverse operation of the relay 6Z, by reason of the energization of route relay 50—101 and the closure of contact 240, is maintained even though the route relay 50—101 is deenergized by the restoration of its controlling entrance button EB. This is because the relay 6Z (and all other relays Z) is of the magnetic stick type. Thus, upon the picking up of the lock relay 6L, the lever lock equivalent feature takes effect, that is, the closure of front contact 244 and front contact 245 of relay 6L does not cause the relay 6WZ to receive energy through contact 241 of relay 6Z in a reverse position, because the relay 6LP is not reenergized upon the picking up of the lock relay 6L and energy cannot flow through open front contact 242. In other words, the relay 6LP does not pick up when relay L picks up if the contacts 241 and 346 are out of correspondence with contact 243 of relay 6WPP.

In order to reenergize the lock relay 6LP under such a circumstance, it is necessary that the relay 6Z be restored to its normal position into correspondence with relay 6WPP so as to apply energy to the line circuit including line wire 226. Such restoration of the relay 6Z to a normal position requires either the actuation of the entrance-exit buttons for the route relay 50—90, or the actuation of the emergency switch machine control lever 6SML to a normal position. When relays 6Z and 6WPP are in corresponding positions, the relay 6LP is energized, assuming of course that the lock relay 6L is energized.

Under the usual circumstances of operation, the relay 6Z is not to be operated out of correspondence with the track switch 6TS while the lock relay 6L is deenergized, because the lock indicator 6LK is illuminated by reason of the closure of back contact 278 of lock repeating relay 6LP and warns the operator against such undesired operation. However, the above operation provides for the restoration of the system to a normal condition in the event that the operator disregarded the illumination of the lock indicator 6LK; or in the event that such indicator was burned out; or in the event of any other cause for the effective operation of this protective part of the system.

This lever lock equivalent is therefore provided to apply a check upon the operator for operating the entrance-exit buttons at a time when it is impossible to operate a track switch included in the proposed route, and thereby affords the protection that a momentary energization of the lock relay 6L does not effect an operation of the track switch undesirably during the passing of a train. Such momentary energization of the lock relay L is of course possible only upon the failure of the track circuit due to a light train, rusty rails or the like.

In an interlocking plant such as a large busy terminal that is extremely busy, exactly the opposite conditions prevail, that is, the track circuits are very reliable because of the continued use of the rails and the lever lock equivalent feature may not be necessary. In fact, such lever lock equivalent feature in a busy plant may be desirably omitted in order to provide what is termed preconditioning. This may be accomplished by omitting the front contact 242 of relay 6LP in Fig. 5 as well as the polar contact 243 of relay 6WPP. In other words, the right hand terminals of the windings of the relay 6LP are connected together to the line wire 226. This is illustrative of the change required for the control for each of the track switches. Such an arrangement provides that as soon as a train has accepted a first route, the operator may return the entrance button to normal for such route, and then operate the entrance-exit buttons for a conflicting route although the lock indicators LK are illuminated in the first route due to the presence of a train. As soon as the train in the first route passes beyond the conflicting switches, such switches are released in accordance with the principles of locking disclosed in Figs. 8A and 8B, so that the second route is immediately set up.

The system is so organized that a lock relay for a track switch will not be dropped for any reason other than for the clearing of a route or the presence of a train. Inasmuch as the dropping of the lock relays is initially accomplished by the picking up of the relays GZ due to the picking up of a route relay, it is necessary to delay the picking up of the GZ relays until the route is physically established even though the signal control from the route relay is ready at the same time the individual switch controls are transmitted. This delay of the signal control is particularly necessary with rear release route locking as shown in Figs. 8A and 8B, because such route locking involves directional stick tumble down relays which may tumble down with regard to switches not included in a proposed route if the picking up of a GZ relay is allowed to drop such relays prior to the actual physical setting up of the route as repeated and indicated on the correspondence relays NCR and RCR. The circumstances involving such operation will perhaps make more clear the feature under consideration.

Let us assume that the track switches 1TS, 2TS and 3TS are all in normal positions and that the operator desires to set up a route from K to A and another route B to D. The rotation of the entrance button 50EB in a counterclockwise direction followed by the actuation of the exit button 10XB causes the switch controls for the reversal of track switches 2TS and 3TS to be transmitted.

If the signal control for the relay 50WGZ were not delayed by the selections through the relays 2WPP and 3WPP as shown in Fig. 6, then the relay 50WGZ would be immediately picked up opening the circuit for relay 5WS at back contact 386 of Fig. 8B. The deenergization of relays 5WS would cause the deenergization of relay 3WS by reason of open front contact 440 because this contact 440 of relay 5WS is not shunted out by contact 441 of relay 3RCR until the corresponding track switch 3TS is operated to its reverse position. The dropping of 3WS opens the circuit for the lock relays 1L and 4L at contact 442 so that the corresponding track switches 1TS and 4TS are locked immediately upon the picking up of the route relay 10—50 and remain deenergized until the track switch 3TS is operated to a reverse position in correspondence with its switch control and shunts out the contact 440 of relay 5WS by contact 441 of relay 3RCR.

The operator, however, would immediately actuate the entrance button 20EB and the exit button 60XB immediately following the operation of the entrance button 50EB and the exit button 10XB. This would cause the route relay 20—60 to be picked up and endeavor to operate the track switches 1TS and 4TS even before the track switch 3TS has operated to its reverse position. Such operation of the relays 1Z and 4Z for the track switches 1TS and 4TS would cause the dropping of their respective lock repeating relays 1LP and 4LP (not shown) and prevent their picking up when the track switch 3TS has operated to its reverse position so that the lever lock equivalent would be rendered effective to prevent a proper setting up of a route through the track layout until the relays 1Z and 4Z were restored into correspondence with their respective switches by the switch control levers 1SML and 4SML respectively.

Such an occasion of a locking up of the system under a proper clearing of a route is prevented by the selection of the circuit for relay 50WGZ through polar contacts 305 and 304 in left hand positions so that the polar contact 443 and front contact 444 of route relay 10—50 cannot transmit a signal control until the route has actually responded. This delay of the transmission of the signal control, which signal control accomplishes the initial deenergization of the directional stick tumble down relays, makes possible the tumbling down of only those directional stick relays which are included in the actual route set up. Therefore, both the advantages of route locking and the lever lock equivalent may be had in the same system with entrance-exit route control as provided in accordance with the present invention.

*Call-on signal control.*—The above description has considered the control of the usual signals, which signals are of the usual type to allow the passage of traffic and which in practice would probably include automatic track circuit control so as to place the signals at stop when there is a train in the rear of such signals. Such automatic control has not been illustrated in Fig. 5 in connection with the typical control of the signal 101, but has merely been mentioned as a possible control in accordance with the usual practices which may be inserted in the circuit for the relay 101G, such as shown for example in the prior patent to Larry and Langdon, Patent No. 2,125,242 dated July 26, 1938.

However, when such automatic control is provided, it is often desirable to provide what is termed a call-on signal so as to allow the passage of a train onto a track section already occupied such as in the case of an engine coming up to a standing train to connect therewith for switching purposes. Such control of signals 50E and 50EC of Fig. 1 has been shown in Fig. 9. The control shown in Figs. 6 and 7B for relay 50EGZ is merely of the neutral type although the relay 50EGZ has been shown in Fig. 7B as being of the polar neutral type because it is desired to show in Fig. 9 a modified control of this relay for the purpose of accomplishing the control of a call-on signal. In other words, only (B+) has been shown in Fig. 6 as applied to front contacts 445 and 446 of relays 50—101 and 50—90 in order to render the selection of Fig. 6 uniform and make clear the description in connection therewith under the circumstances considered up to the present point.

However, this selecting circuit for the relay 50EGZ so as to control the signal 50E in accordance with the above operations and to also control the call-on signal 50EC, as now to be described, may have positive or negative energy from (B+) or (B—) applied thereto so as to position its polar contacts to properly select either of two signal relays 50EG or 50ECG when the entrance button 50EB is provided with added positions for the purpose of a call-on signal control.

With reference to Fig. 2, the entrance button 50EB is provided with a cam 210 for operating its contacts 222—223 and 221—220 for controlling the respective relays 50WR and 50ER. In Fig. 9 this entrance button 50EB is provided with a cam 447 which operates the same contacts for controlling the relays 50WR and 50ER, as well as added contacts 448—449 and 450—451 for respectively controlling added relays 50WCR and 50ECR. When the entrance button 50EB is rotated counterclockwise to a 90° position the contacts 222—223 are closed, but when the entrance button 50EB is rotated counterclockwise to its 135° position contacts 448—449 are also closed for energizing the relay 50WCR. Similarly, when the entrance button 50EB is rotated clockwise to its 90° position contacts 220—221 are closed for energizing relay 50ER, but when the entrance button 50EB is rotated clockwise to its 135° position contacts 450—451 are also closed for energizing the relay 50ECR.

Let us assume that the operator desires to clear the signal 50E. To do this, he rotates the entrance button 50EB in a clockwise direction to its 90° position which energizes the relay 50ER and also actuates the exit button 101XB. This supplies energy to the route relay 50—101 by a circuit closed from (+), through a circuit including front contact 212 of relay 50ER, back contact 211 of relay 50—90, windings of relay 50—101, back contact 215 of relay 101R, back contact of exit button 101XB, to (—). The energization of the route relay 50—101 of course controls the track switch 6TS, as previously considered, after which the signal control is transmitted because the relay 6WPP has its polar contact 452 in a left hand reverse position to complete a circuit for relay 50EGZ from (B+), through a circuit including back contact 462 of relay 50ECR, front contact 453 of relay 50ER, front contact 445 of relay 50—101, polar contact 454 of relay 50—101 in a right hand position, polar contact 452 of relay 6WPP in a left hand position, wire 234, windings of relay 50EGZ, back contact 266 of relay 50ERR, to the common return line (CN).

It is apparent that this energization of the relay 50EGZ actuates its polar contacts to the right and picks up its neutral contacts including contact 455 to connect the common return line (CN) to the right hand terminal of the relay so that upon the picking up of the relay 50ERR, as described above in connection with Fig. 7B, the relay 50EGZ will be wholly dependent upon the condition of energization of its controlling relay 50ER.

With relays 50ERR and 50EGZ both energized and the track section including track relay 9T unoccupied, a circuit is closed for the relay 50EG from (+), through a circuit including front contact 456 of relay 50ERR, front contact 457 of relay 50EGZ, polar contact 458 of relay 50EGZ in a right hand position, front contact 459 of relay 9T, windings of relay 50EG, to (—). This energization of the relay 50EG opens its back contact 460 and closes its front contact 460 to change the indication of signal 50E from stop to clear.

It may happen that the track section including track relay 9T is occupied so that contact 459 is open, although the operator still desires to cause a train to pass the signal 50E which cannot now be cleared. Under such circumstances the operator causes the call-on signal 50EC to be cleared by rotating the entrance button 50EB clockwise to its 135° position also closing contacts 450—451. This causes (+) to still be applied to the front point of contact 212 so that the route relay 50—101 continues to be energized, but the energization of relay 50ECR removes (B+) from the front point of contact 453 and through its back point 462 but causes (B—) to be applied through front point 462 of relay 50ECR. Such application of energy to the energizing circuit of relay 50EGZ causes its polar contacts to be operated to the left and its neutral contacts to be picked up. The operation of polar contact 458 to the left completes an energizing circuit for the relay 50ECG from (+), through a circuit including front contact 456 of relay 50ERR, front contact 457 of relay 50EGZ, polar contact 458 of relay 50EGZ in a left hand position, windings of 50ECG to (—). The energization of relay 50ECG opens back contact 463 and closes front contact 463 to change the indication of signal 50EC from stop to clear. It is thus readily apparent that the call-on signal 50EC is cleared independent of the track section including track relay 9T.

The restoration of the entrance button 50EB to its normal position restores the signal 50EC to stop.

It is evident that if the exit button 90XB were operated to select the route relay 50—90 that the track switch 6TS would be in a normal position and that the relay 50EGZ would receive similar control through contacts 464 of relay 50ER and 465 of relay 50ECR but including neutral contact 446 of relay 50—90 and polar contact 466 of relay 50—90 with polar contact 452 of relay 6WPP in a right hand position If the opposite direction over the track switch is to be set up, the route relays 50—90 and 50—101 may be controlled in a similar manner as pointed out in connection with Figs. 3A and 3B because the exit button 50WXB can apply energy to the route relays through its back point from (—) and back contacts 461 and 212 of relays 50ECR and 50ER as both deenergized. This checks that the entrance button 50EB is in a normal position or in a position to clear the signal 50W. The relay 50WCR may control a similar call-on signal associated with the signal 50W but for the sake of simplicity this control has not been shown.

It may be desirable to use two entrance buttons, one for each direction in place of the entrance button 50EB. Such an arrangement has been shown in my prior Patent No. 2,121,846, dated June 28, 1938. Fig. 12 shows the call-on control of Fig. 9 arranged with two entrance buttons and also two exit buttons organized in accordance with the present invention.

In Fig. 12 an entrance button 50EEB² is shown for controlling the signal 50E and an entrance button 50WEB² shown for controlling the signal 50W. Exit buttons 50EXB² and 50WXB² have been shown associated with these respective entrance buttons. The entrance button 50EEB² has been shown as having a cam 470 which closes contacts 471 and 472 when the entrance button is rotated clockwise to thereby energize the relay 50ER for clearing the signal 50E with the operation the same as above described in connection with Fig. 9. If however, the call-on signal is desired to be cleared, the entrance button 50EEB² is operated counterclockwise to close contacts 473 and 474 to energize the relay 50ECR for clearing the call-on signal 50EC as described in connection with Fig. 9. It is noted that the same reference characters have been given to the relays 50ER and 50ECR as in Fig. 9 so that the controlling circuits may be considered the same, the only difference between Fig. 12 and Fig. 9 being in the provision of separate entrance buttons instead of a single entrance button with the rotation of the buttons provided to be in opposite directions for the main signal and the call-on signal instead of in the same direction as in Fig. 9.

With this arrangement the relays 50ER and 50ECR, are energized separately and not at the same time as in Fig. 9, thus the "route selecting circuit" receives energy from (+) through either front contact 212 of relay 50ER alone, or through front contact 461 of relay 50ECR and back contact 212 of 50ER. Also the signal control for the selected route receives (B+) through front contact 453 of relay 50ER or receives (B—) through front contact 462 of relay 50ECR and back contact 453 of relay 50ER.

In other words, the clockwise rotation of the entrance button 50EEB² operates the contacts 471—472 to energize the relay 50ER which applies (+) to front contact 212 to the relay 50—101 upon the operation of the exit button 101XB for example. Similarly, the rotation of the entrance button 50EEB² in a counter clockwise direction closes contacts 473—474 to energize the relay 50ECR to also apply (+) to the relay 50—101 through front contact 461 and back contact 212 upon the actuation of the exit button 101XB (see Figs. 2, 3B and 9). The signal control for the selected route receives (B+) or (B—) depending upon whether the relay 50ER or 50ECR is picked up, which circuit is selected through the route relays 50—101 and the relay 6WPP as shown in Fig. 9 so as to properly control the relay 50EGZ.

Fig. 11 contemplates a similar arrangement of entrance and exit buttons as shown in Fig. 12. This arrangement includes entrance buttons 50EEB¹ and 50WEB¹ with their corresponding exit buttons 50EXB¹ and 50WXB¹. Instead of using relays as 50ER and 50ECR to interlock the call-on and main signal controls with the exit button control, a mechanical interlock is provided. The entrance button 50EEB¹ is provided with a cam 475 to actuate a movable contact 476 into contact with a fixed contact 477 when the entrance button 50EEB¹ is rotated either clockwise for the main signal control, or counter clockwise for the call-on signal control, to thereby apply energy to the "route selecting circuits" the same as shown in Fig. 9. When the cam 475 is in either of these positions, the actuation of the exit push button 50EXB¹ can do nothing as the push rod 478 merely contacts with the left hand side of the movable contact 476 and causes a further closure of contact 476 with fixed contact 477. If, however, the entrance button 50EEB¹ is in a normal position, the actuation of the exit button 50EXB¹ causes the push rod 478 to contact with the right hand side of the movable contact 476, which causes the contact 476 to be actuated by the cam surface of push rod 478 into contact with fixed contact 479 which applies (—) to the "route selecting circuits", the same as the exit button 50EXB in Fig. 9.

The entrance button 50EEB¹ is provided with a cam 480 which actuates movable contact 481 into contact with fixed contact 482 when the entrance button is moved clockwise to its main signal controlling position to thereby place (B+) on the "signal control for the selected route" such as provided by the relays 50ER and 50ECR of Fig. 9 to the winding of relay 50—101. In a similar manner, the actuation of the entrance button 50EEB¹ counter clockwise actuates the movable contact 483 into contact with a fixed contact 484 to apply (B—) to such "signal control for the selected route" to give the call-on signal. It is to be understood that as many of these contacts as may be necessary should be provided for this entrance button to replace the various contacts which would be employed on relays such as 50ER and 50ECR of Fig. 9. It is also to be understood that this mechanical interlock may be used for each of the entrance-exit button combinations shown in Fig. 2, if such appears desirable.

*Structure of push buttons.*—The structure of entrance buttons having located thereon the indicator lamps as described in connection with Fig. 2, may be of any suitable design such as shown for example in the patent to J. F. Merkel, Patent No. 2,091,155 dated August 24, 1937, or any other suitable structure which may be adapted for accomplishing the purposes and operations set forth in connection with the system of the present invention. It may be desirable, however, instead of having the exit push button control separate from the rotary entrance button control to have these two means combined in a single structure which has been shown in Fig. 10 to illustrate what is contemplated. The control panel 485 is shown as supporting a contact mounting 486 which also has located thereon a fixed member 487 to house the indicator lamp 488 and over which is located a movable push button 489 biased outwardly by spring 490 and having a central aperture covered by a suitable lens 491. The actuation of this push button against its bias closes movable contacts 492 and 493 with their respective fixed contacts 494 and 495.

The rotation of the knob 488 by reason of cam surfaces located thereon causes movable contacts 496 and 497 to be actuated into contact at certain times with their respective fixed contacts 498 and 499. The time at which this knob 488 closes the contacts 496—498 and 497—499 may be arranged in accordance with the desired controls required of the system of the present invention in accordance with any of the figures disclosed herein such as Figs. 2, 9 and 12. The rotary knob 488 has a small set screw 500 which holds it in position on a fixed plane with a panel 485. Various other structures of this general type may be employed, this structure being chosen merely to illustrate how an indicator lamp may be enclosed inside of a push button which is also inside of a rotary knob. This arrangement is believed to simplify the structure and to take less space on the control panel than would be required for separate entrance buttons and exit buttons.

*Summary.*—A system of electric interlocking of the entrance-exit type has therefore been disclosed with features of operation which facilitate in the passage of traffic through an interlocking plant with a minimum number of operations required of the operator. Not only are the number of operations reduced from the standpoint of eliminating the individual switch controls in any route, but the selection of optional routes is automatically taken care of under certain circumstances although the manual setting up of an inferior route may be also effected.

The system of the present invention also provides that certain switches may be automatically operated to provide derail protection without requiring additional attention on the part of the operator.

The system of the present invention also provides that routes may not be preconditioned, that is, when a first route is set up, a conflicting second route cannot be set up until the train has passed from the first route. If such rule is disregarded by the operator, then it becomes necessary for him to manually restore the system to normal before the second route can be set up by the entrance-exit buttons controlling such route.

All of the features of the present invention have been organized with the purpose of simplifying the operation of a system from the standpoint of the operator, but still providing the utmost in safety and reliability in the control of the traffic controlling devices involved in an interlocking plant.

Having thus described a centralized traffic controlling system as one specific embodiment of the present invention, it is desired to be understood that this form is selected to facilitate the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention except as limited by the appended claims.

What I claim is:

1. In an interlocking system for railroads, a plurality of optional routes through a track layout, a signal at the common entrance to said optional routes, an entrance button for the common entrance to said optional routes, an exit button for the common exit of said routes, means responsive under normal conditions to the joint operation of said entrance and exit buttons alone for clearing a predetermined one only of said optional routes, and means responsive to the joint operation of said entrance and exit buttons under other conditions when said predetermined one of said routes is unavailable for use for clearing the other of said optional routes.

2. In an interlocking system for railroads, a plurality of optional routes through a track layout, a signal at the common entrance to said optional routes, an entrance button for the common entrance to said optional routes, an exit button for the common exit of said routes, means responsive at times to the joint operation of said entrance and exit buttons alone for setting up a predetermined one of said optional routes and clearing said signal, and means responsive to the joint operation of said entrance and exit buttons at other times when a part of said predetermined route is occupied by a train for setting up another of said optional routes and clearing said signal.

3. In an interlocking system for railroads; a plurality of routes through a track layout, certain ones of which have a common entrance and a common exit; a signal governing traffic at each entrance; an entrance button for each entrance; an exit button for each exit; means responsive to the joint actuation of an entrance button and an exit button alone for setting up a route between the corresponding entrance and exit routes and clearing said signal at the entrance to said route; and means governed by traffic conditions and also manually controllable for selecting which particular one of said routes having a common entrance and a common exit shall be set up when the corresponding entrance and exit buttons are actuated.

4. In an interlocking system for railroads; a plurality of routes through a track layout, including at least two alternative routes which have a common entrance and a common exit; a signal governing traffic at each entrance; an entrance button for each entrance; an exit button for each exit; means responsive to the joint actuation of an entrance button and an exit button alone for setting up under normal conditions a predetermined one of said alternative routes in preference to the other inferior route between corresponding entrance and exit points and clearing said signal at the entrance to said route; and manually operable means changeable from a normal condition for causing said other inferior alternative route to be set up when the corresponding entrance and exit buttons are actuated.

5. In an interlocking system for railroads, a route through a track layout including power operated track switches in predetermined positions, a signal for each end of said route to thereby govern traffic in opposite directions, an entrance button for each end of said route, a self-restoring push-button for each end of said route distinguishable from the entrance buttons, a route circuit for said route, a route relay in said route circuit acting when energized to control the operation of said switches and to govern the clearing of one signal or the other according to the polarity of energization of said route relay, means including said entrance button for one end in an actuated position for applying potential of one polarity to said route circuit at that end, means including said exit button for said one end in an actuated position for applying potential of the opposite polarity to said route circuit at that end only when said entrance button for that end is in a non-actuated position, means including said entrance button for the other end in an actuated position for applying potential of one polarity to said route circuit at that end, means including said exit button for said one end in an actuated position for applying potential of the opposite polarity to said route circuit at that end only when said entrance button for that said one end is in a non-actuated position, whereby the actuation of an entrance button at one end and the actuation of an exit button at the opposite end of a route circuit energizes such route circuit, and stick circuit means for maintaining said route circuit energized when an exit button is released.

6. In an interlocking system for railroads, a section of railway track having diverging tracks connected thereto by track switches, a first signal at one end of said section for governing traffic into said section in one direction, another signal at the other end of said section governing traffic in the other direction, an intermediate signal between said signals at the opposite ends of said section for governing traffic through a part of said section in said one direction, an entrance button for each of said signal locations, an exit button for each end of said section and one for the location of said intermediate signal, means responsive to the joint operation of said entrance button for said another signal governing traffic in said other direction and said exit button for the opposite end of said section to clear such signal, means responsive to the joint operation of said entrance button for said first signal governing traffic in said one direction and said exit button for said intermediate signal location for clearing said signal for said one direction, and means responsive to the joint operation of said entrance button for said intermediate signal governing traffic in said one direction and said exit button for the opposite end of said section for clearing said intermediate signal.

7. In an interlocking system for railroads, a plurality of routes through a track layout having track sections interconnected with track switches and having signals governing traffic over such routes, a route relay for each of said routes, circuit means energized by closure of contacts of each of said route relays for concurrently operating all of the track switches for that route corresponding to such relay, signal clearing circuits for each signal, one circuit for each route over which said signal governs train movement, said signal clearing circuits including contacts of corresponding route relays, whereby a signal is cleared for a given route only if all of the track switches have completely operated to the proper positions for that route.

8. In an interlocking system for railroads, a plurality of routes through a track layout having track sections with interconnecting track switches and with signals governing the passage of traffic over such routes, a stay-where-put rotary type entrance button for the entrance end of each route, a self-restoring push button type exit button for the end of each route, a miniature track diagram of said track layout, said entrance and exit buttons being located on said track diagram at points corresponding with their associated entrance and exit signal locations, means responsive only to the joint operation of an entrance button at one end of a route and an exit button at the opposite end of that route to automatically establish a route between such points by operating the required track switches to normal and/or reverse positions and clearing a signal for that route, and means for maintaining a route established wholly dependent upon the operated entrance button for that route, whereby the direction of traffic through a route is determined by the combination of entrance and exit buttons operated to establish that route, and whereby only an entrance button is required to remain in its operated position to maintain a route in an established condition.

9. In an interlocking system for governing the operation of track switches and signals of a track layout having a plurality of routes over the track switches, a signal for each end of each route for governing traffic over that route in opposite directions, a manually operable entrance button and an independently manually operable exit button for each end of each route, the manual movement of said entrance and said exit buttons being different, and electro-responsive route establishing means for each route, said route establishing means for a given route being rendered effective by the joint actuation of the entrance and exit buttons alone belonging to that route, said route establishing means for each route controlling the operation of all of the track switches to set up such route and also controlling the clearing of the signal for the end of that route corresponding to the end at which an entrance button was actuated, whereby the establishing of a route and the direction of traffic over that route is determined by the actuation of an entrance button and an exit button for opposite ends of that route.

10. In an interlocking system for manually controlling the power operation of track switches and signals of a track layout affording a plurality of routes between signal locations, a manually operable entrance button for each signal location, a separate manually operable exit button associated with each entrance button to define that signal location as the exit end of a route, said entrance buttons remaining in their manually operated positions until manually restored, said exit buttons being self-restored after each manual operation, and route establishing means for each route requiring only the operation of an entrance button and an exit button belonging to that route to be rendered effective, each of said route establishing means when thus rendered effective automatically controlling the operation of all of the track switches in the corresponding route to the proper normal or reverse positions and also controlling the clearing of the signal for that route corresponding to the entrance button actuated.

11. In an interlocking system for railroads, a plurality of routes through a track layout having track sections with interconnecting power operated track switches and with signals governing traffic over such routes, locking means for each switch operable to prevent operation thereof, independently operable entrance and exit buttons for each end of each route, each of said exit buttons being a self-restoring push button, switch control means for each route responsive only to the joint operation of an entrance button at one end of its route and an exit button at the opposite end of such route to automatically cause that route to be set up by operating the required track switches to normal and/or reverse positions, signal control means for each route responsive to such joint operation of said entrance and exit buttons for its route only after all of said track switches for that route have completely operated to proper positions as required by said switch control means and only provided said locking means for all of said track switches have been operated to lock said switches in such positions, and a clearing circuit for the signal of each route closed upon response of said signal control means of that route.

12. In an interlocking system for railroads, a plurality of routes through a track layout having track sections with interconnecting track switches and with signals governing traffic over such routes, said routes including at least two alternative routes between common entrance and exit ends, an entrance button and a separate exit button for the end of each route, switch control means for each route responsive to the joint alone operation of an entrance button at one end of its route and an exit button at the opposite end of such route to automatically cause that route to be set up by operating the required track switches to normal and/or reverse positions, said switch control means responding automatically to the joint operation alone of the entrance and exit buttons for the common entrance and exit ends of said alternative routes to set up a predetermined one of said alternative routes in preference to the other, locking means for each route governed by the operation of said entrance and exit buttons for that route for locking said track switches after they have all been operated to proper positions as required by said switch control means for such route, signal control means for each route responsive to such joint operation of said entrance and exit buttons only after all of said track switches have been locked by said locking means in positions as required by said switch control means, and a clearing circuit for the signal of each route closed upon response of said signal control means of that route.

13. In a system for governing the operation of track switches and signals of a railroad track layout, a control machine comprising a miniature track diagram of said track layout, said track layout including an arrangement of switches to provide two alternative routes from one signal location to another signal location, manually operable buttons associated with said track diagram and located thereon at points corresponding with said signal locations, means responsive to the joint actuation of said buttons alone and normally effective for operating all the track switches to position required for a preferred one of said alternative routes, and means also responsive to the joint actuation of said two buttons alone and automatically effective if the first preferred route is not available for controlling one or more of said switches to a different position to establish the other of said alternative routes.

14. In a switch and signal control system for a railway track layout having at least two alternative routes with common entrance and exit points and also having one or more other routes conflicting with a particular one of said alternative routes, a control machine including manually operable buttons for the entrance and exit points of said alternative routes, means responsive to the joint actuation of said entrance and exit buttons alone for setting up said particular one alternative route, other means also responsive to the joint actuation of the same entrance and exit buttons alone for automatically setting up the other of said alternative routes provided one of said conflicting routes is established to prevent setting up said particular one alternative route.

15. In a switch and signal control system for a railway track layout having a plurality of routes and at least two alternative routes with common entrance and exit points, two route establishing circuits one for each of said alternative routes, means effective upon energization of either of said route circuits for preventing the energization of the other, manually operable buttons for said common entrance and exit ends of said alternative routes effective upon the joint actuation thereof to supply energizing current to one of said route circuits for a preferred route only under normal condition, another route establishing circuit for a route conflicting with said preferred one of said alterative routes, and means effective upon the energization of said another conflicting route circuit for preventing energization of the route circuit for the preferred route and permitting energization of the other route circuit by the joint actuation of said buttons.

16. In a system for governing the operation of track switches and signals of a track layout having an arrangement of switches to provide at least two alternative routes between two signals for governing traffic in opposite directions over such two routes, a control machine including manually operable buttons corresponding with said signals, route establishing means at times responsive to the joint operation of said buttons alone for governing the position of the track switches to set up one of said alternative routes and to clear one of said signals for governing traffic thereover, other route establishing means at other times responsive to the joint actuation of said same buttons for governing the position of the track switches to set up the other of said two alternative routes and to clear one of said signals for governing the passage of traffic thereover, selecting means dependent upon the establishment or occupancy of a conflicting route for automatically determining which of said route establishing means will respond to the operation of said buttons, and means for maintaining each of said route establishing means effective after response thereof and until restored to normal irrespective of any subsequent change in said selecting means.

17. In a switch and signal control system for a track layout having a number of possible routes over said track switches between various points, certain of said routes being conflicting with others, said track layout including at least two alternative routes with common entrance and exit points, a control machine including manually operable buttons belonging to said entrance and exit ends of said alternative routes, means including a route circuit energized by the joint operation of said buttons for controlling the operation of track switches to establish a preferred one of said alternative routes, means including another route circuit energizable by the joint operation of the same buttons for controlling the track switches to establish the other alternative route, selecting means normally permitting energization of the route circuit for said preferred route and changeable to prevent such energization but permit energization of said route circuit for the other alternative route, and means effective upon energization of the route circuit for said other alternative route for maintaining such energization irrespective of a change of said selecting means to normal so long as that route circuit is kept energized.

18. In a system of the character described for governing the operation of switches and signals of a railway track layout, a plurality of independently energizable route relays, one for each of the various routes over the track switches of said layout between signal locations, said track layout including an arrangement of switches to provide at least two alternative routes between the same signal locations, entrance and exit buttons for the common ends of said alternative routes, selecting means normally rendering the route relay for a preferred one of said alternative routes responsive to the joint actuation of said buttons alone, and additional manually operable means for operating said selecting means from normal to render the route relay of the other alternative route responsive to such operation of said buttons.

19. In a system for governing the operation of track switches and signals of a track layout having an arrangement of switches to provide at least two alternative routes between common entrance and exit points, a control machine having manually operable buttons for the entrance and exit of said alternative routes, means at times responsive to the joint operation of said buttons alone for governing the position of the track switches to establish one of said alternative routes, means at other times responsive to the joint actuation of said buttons for governing the position of the track switches to set up the other of said two alternative routes, a manually operable device for selecting which of said first and second means will be rendered effective by such operation of said buttons, said manually operable device also governing the operated position of a crossover included in said alternative routes in its different positions, and means for maintaining each of said means effective after actuation thereof regardless of any change of said manually operable device.

20. In a system of the character described for a railway track layout having at least two alternative routes with common entrance and exit points, two route establishing circuits separately energizable for controlling the operation of track switches to positions to set up the corresponding one of said alternative routes, means responsive to the energization of one of said route circuits for preventing the energization of the other, means responsive to the energization of said other circuit for preventing the energization of said first circuit after a time interval of delay, manually operable buttons for the common entrance and exit ends of said alternative routes for simultaneously supplying energy to both of said route circuits upon a joint actuation of said buttons.

21. In a system for governing the operation of track switches and signals of a track layout including at least two alternative routes between common entrance and exit signal locations, two separately energizable route establishing circuits, one for each of said alternative routes, means controlled by each of said route circuits for controlling all of the switches to normal or reverse positions as required for the corresponding route, manually operable entrance and exit buttons for the common entrance and exit ends of said alternative routes, selecting means for determining which of said route circuits for said alternative routes will be energized by the joint actuation of said buttons alone, other manually operable means for governing said selecting means, and means for automatically controlling said selecting means to render one of said route establishing circuits responsive to the joint actuation of said buttons if the route for the other route circuit is not available.

22. In a system of the character described for governing the operation of track switches for two alternative routes in a railway track layout between common entrance and exit signal locations, manually operable entrance and exit buttons, route establishing means one for each of said alternative routes, selecting means normally rendering a particular one of said route establishing means responsive to the joint actuation of said entrance and exit buttons alone and operable to render the other of said route establishing means responsive to such joint actuation of said buttons, other manually operable means for operating said selecting means, automatic means for operating said selecting means to provide for establishing the other of said alternative routes when said particular one is not available, and means effective when either of said route establishing means has responded to the actuation of said buttons for maintaining that condition irrespective of a change in said selecting means until that route establishing means has been restored to normal.

23. In a system for governing the operation of track switches and signals of a railway track layout, a control machine having a diagram at points representing the track switches and the portions of track between the signal locations of such track layout; manually operable buttons located on said diagram corresponding to the signal locations, a plurality of route circuits each individually appertaining to a route over a given portion of track between the signals at the end thereof, each of said route circuits being closed and energized by the operation alone of the two buttons at the entrance and exit ends of the corresponding portion of track, each of said route circuits when energized opening contacts included in the route circuits for all conflicting routes, relay means responsive to the energization of a given route circuit for governing the operation of all of the track switches in that route to a normal or reverse position as required for that route, locking means for each switch effective when deenergized to prevent operation thereof, a clearing circuit for each signal closed only if the locking means for the switches over which said signal governs traffic are deenergized, and means governed by a given route circuit and effective only if all of the switches for the corresponding route have been operated to the proper position for closing a break in the clearing circuit for a signal of that route.

24. In a switch and signal control system for railways, a control machine having a track diagram representing two portions of track of a track layout in end to end relation, each of said portions of track including one or more track switches and having signals governing the train movement over said portions, a plurality of route circuits one for each of said portions of track, means including manually operable buttons associated with the entrance and exit end of each portion of track for energizing the particular route circuit for that portion by the joint actuation of said buttons, means responsive to the energization of each route circuit for controlling all of the switches in the corresponding track portion to the proper normal or reverse position and for clearing a signal over that track portion, and means rendered effective by the actuation of only those buttons at the extreme ends of said two portions of track for energizing the route circuits for both of said portions.

25. In a switch and signal control system of the entrance-exit type, the combination with a control machine having a miniature track diagram representing a track layout, said diagram including a representation of two portions of track of said track layout in end to end relation, each of said portions of track including one or more track switches and having signals for governing train movement over portions of track, manually operable buttons on said track diagram adjacent points corresponding to the ends of said track portions, route establishing means responsive only to the joint actuation of the buttons belonging to entrance and exit ends of each of said track portions for controlling the operation of all of the track switches of that portion to the normal or reverse position as required and for also controlling the clearing of the signal at such entrance end, and means rendered effective by the joint actuation of the two buttons alone at the extreme ends of said two portions of track for actuating said route establishing means for both of said portions.

26. In a system for governing the position of track switches and clearing of signals over a railway track layout, said track layout including two portions of track in end to end relation and each having one or more track switches and signals for governing train movement over said track portions, in combination with manually operable buttons disposed on a miniature track diagram of said layout adjacent points corresponding to the ends of said track portions, of a route circuit for each track portion energized upon the joint actuation of the buttons associated with the ends of that track portion, said route circuit for one of said track portions being also energized upon actuation of the two buttons at the extreme ends of said track portions, and means responsive to the energization of said one route circuit for controlling the energization of the other, whereby manual operation of the two buttons at the extreme ends of said track portion causes energization of the route circuits for both track portions.

27. In a system of the character described, means for governing the position of a plurality of track switches and the clearing of signals for a stretch of railway track comprising, manually operable buttons associated with the extreme ends and with an intermediate point on a diagrammatic representation of said stretch of track, electro-responsive route establishing means belonging to each portion of said stretch of track between said intermediate point and each end for governing the position of said track switches in the corresponding portion, said route establishing means for each portion being rendered effective by the joint actuation of the buttons at the two ends thereof, and circuit means responsive to the actuation of the two buttons alone associated with the extreme ends of said stretch for causing energization of said electro-responsive means for both said portions of said stretch.

28. In a system of the character described, the combination with manually operable entrance and exit buttons disposed at points on a diagrammatic representation of the track layout corresponding to the locations of track signals, a route relay for each portion of track between signals, a circuit for energizing each route relay by the joint actuation of the buttons at the ends of the corresponding portion of track, and means rendered effective by the operation of the two buttons for the extreme ends of two adjoining portions of track in end to end relation for causing energization of both of the route relays for said portions, and means controlled by each route relay for controlling the position of all of the track switches in that route and for clearing a signal.

29. In a system for governing traffic on railroads, a track layout having a plurality of routes formed by track switches, a signal for each end of each of said routes to thereby govern traffic in opposite directions, an entrance button for each end of a route and manually operable to either of two positions, an exit button for each end of said route and manually operable to an actuated position but self-restoring to a non-actuated position, route control means for each route rendered effective in response to the operation of only an entrance button for one end and the momentary actuation of an exit button for the opposite end of that route to operate the switches to proper postions and clear the signal for the end corresponding to the end at which the entrance button is actuated, said route control means being effective only when both an entrance button and an exit button has been operated, an indicator for each of said signals associated with its corresponding one of said entrance buttons, and means for energizing each indicator when its corresponding signal is cleared.

30. In a system for governing the track switches and signals of a railway track layout, a control machine having a control panel with said track layout represented thereon by a miniature track portion for each corresponding portion of the actual track, a rotary stay-where-put entrance button at the opposite ends of each miniature track portion, said entrance button having thereon an arrow indicating the direction of train movement governed thereby and an insignia indicating its rotated position, a self-restoring exit push button at the opposite ends of each miniature track portion, electro-responsive means individually associated with each of said track portions and energized in response to only the operation of the entrance button at one end of its miniature track portion and the contemporaneous momentary operation of the exit button at the opposite end of its miniature track portion, circuit means for each of said electro-responsive means effective to maintain its electro-responsive means energized dependent upon said operated entrance button irrespective of the self-restoration of said operated exit button, and means controlled by the said electro-responsive means for each track portion for operating the track switch in that portion and clearing a signal for allowing the passage of traffic thereover.

31. In a system of traffic control, a stretch of track having turnout track switches, a signal at one end of said stretch for governing traffic thereover, a control machine including a control panel, an entrance button on said control panel for the signal end of said stretch of track, an exit button on said control panel for the opposite end of said stretch of track, route control means for said stretch of track responsive to the joint operation of only said entrance and exit buttons so as to be rendered effective to control said switches to set up a route over said stretch of track and to clear said signal, route indicator means on said control panel associated with said entrance and exit buttons and controlled by said route control means to indicate when a route is set up over said stretch of track, and signal indicator means located within said entrance button controlled by the condition of said signal to indicate when such signal is cleared.

32. In a system of switch and signal control, a track layout having an arrangement of track switches to provide at least two non-conflicting routes with a conflicting route common to both of said non-conflicting routes, signals for governing traffic over said routes, a control machine having a control panel, manually operable buttons on said control panel for the ends of said routes, route establishing means for each of said routes responsive to the joint operation of said buttons for the opposite ends of such route, switch control means for each of said track switches, means controlled by each of said route establishing means to actuate those of said switch control means required to set up the corresponding route, other means controlled by each of said route establishing means for said non-conflicting routes to actuate one of said switch control means and operate to the reverse position a switch not involved in the route being set up but required to be in the reverse position to set up the other of said non-conflicting routes in part, thereby providing derail protection for that one of said non-conflicting routes completely set up, and signal control means individual to each of said routes and controlled by said route establishing means for that route to clear a signal for such route only after it has been completely set up and locked.

33. In a system of the character described for a railway track layout having several track switches operable to provide a plurality of routes in end to end relation over adjoining portions of track, a control machine having a miniature track diagram of said track layout, manually operable entrance buttons for the ends of said routes, there being only one such button movable to different positions for train movement in opposite directions located on said diagram at each place corresponding to the adjoining ends of said various routes, an individually operable exit push button for the opposite ends of each of said routes, and route establishing means for each of said routes governed by the joint operation of the entrance button for one end of such route in the appropriate position and the exit button for the opposite end of said route, whereby the plurality of routes having end to end relation can be successively established for one or the other direction of train movement over the adjoining portions of track with individual manipulations for each route at the points having adjoining ends.

34. In a system of the character described for a railway track layout having a portion of track with signals at the opposite end of such portion to govern traffic in opposite directions and having intermediate turn out track switches, a control machine having a miniature track diagram of said portion of track, a rotatable entrance button on said track diagram at each point on said diagram corresponding to an entrance signal location of the actual track layout, a self-restoring exit button of the push button type on said track diagram at points corresponding with each exit signal location but being different in appearance so as to be readily distinguishable from such associated entrance buttons, and route establishing means for controlling said track switches and for clearing said signal at one end of the track portion in response to only the actuation of said entrance button for said one end and said exit button for the other end, and for controlling said track switches and for clearing said signal at the other end in response to only the actuation of said entrance button for such other end and the exit button for said one end.

35. In a system of the character described for a railway track layout having a portion of track with signals at the opposite end of such portion to govern traffic in opposite directions and having intervening turn out track switches, a control machine having a miniature track diagram of said portion of track, entrance buttons on said track diagram at the points on said diagram corresponding to the signal locations of the actual track layout, a signal indicator for each of said signals located within the associated entrance button for that signal, exit buttons on said track diagram associated with said entrance buttons but being different in appearance so as to be readily distinguishable from their associated entrance buttons and having arrow indices thereon to designate the directions which such exit buttons govern, route establishing means for controlling said track switches and for clearing said signal at one end of the track portion in response to only the actuation of said entrance button for said one end and said exit button for the other end, and for controlling said track switches to set up a route over said track portion and for clearing said signal at the other end in response to only the actuation of said entrance button for such other end and the exit button for said one end, and means associated with each of said signals for illuminating its associated signal indicator lamp when it is cleared.

36. In a system of the entrance-exit type for governing switches and signals of a track layout, a control machine including a track diagram representing portions of track between signal locations and various track switches, an entrance button located on said diagram at each point corresponding to an entrance signal location, a self-restoring exit button located on the diagram at the exit end of the portion of track between the signal location represented by the entrance button and the next signal governing traffic in the same direction, said entrance and exit button being located on the track diagram in alinement with the miniature trackway and having insignia thereon indicating the direction of train movement governed thereby, route control means associated with each track portion for operating all of the track switches to proper positions in such portion to set up a route between an entering signal and the exit point of such route and then clearing the entering signal corresponding to the particular operated entrance button, said route control means being operated by the joint manual actuation of the entrance and exit buttons alone belonging to the ends of the corresponding route.

37. In a system of entrance-exit type for governing switches and signals of a track layout, a control machine including a track diagram representing portions of track and the various track switches, a rotary entrance button located on said diagram at each point corresponding to a signal location, a self-restoring exit button associated with each entrance button located on the track diagram at the exit end of each portion of track, a miniature track switch point on said track diagram for each of said track switches, a lock light associated with each of said miniature track switches, route establishing means responsive to the joint operation of an entrance button and an exit button alone at opposite ends of a portion of track to set up a route over such portion and to clear a governing signal, means responsive to said route establishing means for controlling said miniature track switches to positions required for the corresponding routes, and means illuminating each said lock lights whenever a route is set up over the corresponding track switch and whenever the corresponding track switch is locked.

38. In a switch and signal control system for a track layout having a plurality of track sections interconnected with track switches with signals for governing traffic over the routes formed thereby; manually operable control buttons for the ends of said routes; route establishing means individually associated with each of said routes and responsive to the joint operation of the two manually controlled buttons only for the opposite ends of such route; an auxiliary switch control lever associated with each of said track switches and having an inactive position and normal and reverse operating positions; switch control means for each track switch governed by each of said route establishing means associated with a route including that track switch for operating said track switch to proper positions to set up such route only when said switch control lever for that switch is in its inactive position, said switch control means also being governed by its said switch control lever to control its respective track switch to normal and reverse positions only when such switch control means is not governed by any route establishing means; and circuit means controlled by each of said route establishing means for clearing the signal for governing traffic over its respective route and effective only after all of the track switches for its route have been completely operated to proper positions for such route.

39. In a switch and signal control system for a track layout having a plurality of track sections interconnected with track switches with signals for governing traffic over the routes formed thereby, a miniature track diagram of the track layout, manually operable control buttons for the ends of said routes located on said track diagram, route establishing means individually appertaining to each of said routes and responsive to the operation of the manually controlled buttons alone for the opposite ends of such route, switch control means for each track switch governed by each of said route establishing means appertaining to a route including that track switch for operating such track switch to proper positions to set up such route, an auxiliary switch control lever associated with each of said track switches and having an inactive position and normal and reverse operating positions, means rendering said switch control lever effective to control its respective track switch to normal and reverse positions through the medium of said switch control means for that switch only when such switch control means is not governed by any route establishing means, said means also preventing said switch control means from being governed by any of said route establishing means while said switch control lever is rendered effective, normally inactive visual indicating means on said track diagram for each switch and responsive to the operation of the corresponding switch control means by either its associated auxiliary switch control lever or said route establishing means for indicating on said track diagram the controlled position of that switch, and circuit means controlled by each of said route establishing means for clearing the signal for governing traffic over its respective route and effective only after all of the track switches for its route have been completely operated to proper positions for such route.

40. In a system for governing the operation of track switches and signals of a railway track layout providing a plurality of routes from common entrance point to different exit points, switch control means for each switch in said routes and having normal and reverse contacts for governing the operation of that switch to the normal or reverse position, a lock relay for each switch which must be energized to permit operation thereof, contact means associated with each switch and operated in accordance with its position, a circuit for each of said routes including said contact means of a switch and also the normal and reverse contacts of its switch control means with respect to all of the switches in that route, a signal at the common entrance to said routes, clearing circuits for said signal for each route and including back contacts of the lock relays of the switches in that route, means responsive to the energization of said circuit for a given route for deenergizing only the lock relays of the switches involved in that route, manually operable entrance and exit buttons associated with the entrance and exit ends of said routes, and means responsive to the joint actuation of an entrance button and an exit button alone belonging to a given route for governing the switch control means of all of the switches for that route and for concurrently closing a break in said circuit corresponding to that route and also preventing the governing of the switch control means to establish any other of said routes, whereby the lock relays are not de-energized for clearing the signal until all of the switches have operated their contacting means to positions corresponding with the normal and reverse contacts of their switch control means, and whereby said routes are interlocked so that only one can be established at a time.

41. In a system of the character described for establishing routes over a railroad track layout by the actuation of the entrance-exit buttons associated with the ends of such routes, an individual switch control means for each switch having normal and reverse contacts controlling the operation of such switches to its normal or reverse position, contacting means associated with each switch and operated in accordance with the position of that switch, a circuit for each route including said contacting means of the switch and the normal or reverse contacts of its switch control means with respect to all of the switches in the corresponding route, a lock relay for each switch which must be energized to permit operation thereof, route locking stick relays one for each switch and effective when deenergized to deenergize the corresponding lock relay for that switch, and effective when again energized to pick up the corresponding lock relay, means for controlling the stick circuits of certain of said route locking stick relays by one or more other such stick relays dependent upon the position of a switch or switches, manually operable buttons associated with the entrance and exit ends of the various routes, a plurality of electro-responsive route control means one individually appertaining to each of the various routes and energized by the joint actuation of an entrance button and an exit button alone belonging to that route, means responsive to the actuation of the route control means for a given route for governing a switch control means for all of the switches in that route to operate their normal and reverse contacts and cause said switches to assume positions required for such route, a signal clearing circuit for each route including back contacts of the lock relays of the switches involved in that route, and means responsive to the energization of said circuit for each route for closing a break in the corresponding signal clearing circuit and for also at the same time deenergizing the route locking stick relay for each one of the switches in that route, whereby the actuation of the entrance and exit buttons controls the switches for the route, and when these switches respond a circuit belonging to that route is closed to actuate a route locking stick relay and in turn such other stick relays as belong to other switches of the route, thereby deenergizing the appropriate lock relays to close their back contacts in the signal clearing circuit for that route.

42. In a system of the character described for governing the operation of track switches and signals of a track layout to provide for various routes for train movement over said trackway, a neutral-polar switch control relay for each switch having two operating windings neutralizing each other, the energization of either of said operating windings alone causing the polar armature to assume the corresponding position and the energization of both windings at the same time causing no change in the existing position of said polar armature, an auxiliary switch lever movable to a normal or reverse position to energize one or the other of said operating windings, entrance and exit buttons associated with the ends of various routes, and route establishing means responsive to the joint actuation of the entrance and exit buttons of the corresponding route for also energizing one or the other of said operating windings of each of the switch control relays of the switches involved in that route.

43. In a system of the character described for governing the operation of track switches and signals of a track layout by the joint actuation of entrance and exit buttons associated with the ends of the various routes through said track layout, a switch control means individual to each switch, normal and reverse operating circuits for said switch control means each effective to change that means only if the other circuit is open, route establishing means rendered responsive by the joint actuation of the entrance and exit buttons for that route for energizing the normal or the reverse operating circuit for each of the switch control means of the various switches in that route, and an auxiliary manually operable switch lever associated with each switch control means for also energizing its normal or reverse operating circuit, whereby the energization of a normal or a reverse operating circuit of a given switch control means either by a route establishing means or by the auxiliary switch lever prevents a change in the switch control means by energization of its other operating circuit by either the auxiliary switch lever or a route establishing means.

44. In a system for governing the operation of track switches and signals of a railway track layout to establish various routes for train movement through said layout, switch control means for each switch for closing contacts to cause operation of said switch to the normal or reverse position, route establishing means for governing the operation of the switch control means for all of the switches in a given route, manually operable means associated with the entrance and exit end of a route for actuating the route establishing means for that route, manually operable auxiliary switch levers for governing the operation of certain of said switch control means individually, and means for interlocking the control of each switch control means by its auxiliary switch lever and by the route establishing means for the routes over that switch, said interlocking means rendering either the control by the auxiliary switch lever or the control by a route establishing means ineffective to change the switch control means if the other control is acting.

45. In a system for controlling operation of power operated track switches and signals of a railway track layout to set up different routes including at least two alternative routes between common entrance and exit ends, a control machine comprising a miniature diagram of said track layout and manually operable buttons on such diagram located at the entrance and exit ends of available routes through various portions of track over said track switches, electro-responsive route means individually appertaining to each of such routes and rendered effective by the manual operation of the two buttons alone at the entrance and exit ends of the corresponding route for closing contacts to operate each switch in that route to the normal or reverse position as required to establish that route, said electro-responsive means for said alternative routes responding under normal conditions to the actuation of the two buttons alone for the common entrance and exit ends of said alternative routes to establish a predetermined alternative route in preference to the other inferior alternative route, manually operable means changeable from an inactive condition to render said electro-responsive means for said alternative routes effective under other conditions to establish said inferior alternative route upon actuation of the buttons for the common entrance and exit ends of said alternative routes, a signal control relay for each signal at the ends of said routes, an energizing circuit for each signal control relay closed only if all of the switches of the corresponding route have been operated to positions corresponding with the contacts of said electro-responsive means for that route, locking means for each switch governed by said signal control relays, and a signal clearing circuit for each signal closed by energization of the corresponding signal control relay only if said locking means of the switch for the route established for that signal are deenergized, whereby the clearing of each signal is dependent upon the proper positioning and locking of the switches in accordance with the electro-responsive means rendered effective by the manual operation of the buttons for the entrance and exit ends of such route.

46. In an interlocking system for railroads, a track layout including a plurality of track switches arranged to form a plurality of different traffic routes including two alternate routes between the same points at the ends of the track layout comprising a preferred route and a secondary route, a plurality of signals for governing traffic movements over said routes, a manually operable contact for each route end and at each end of the layout, a route circuit for each route, means responsive to the joint operation of the contacts for the opposite ends of a route to energize the route circuit for that route, said means being normally effective in the case of said alternative routes to energize the route circuit for the preferred route only, manually operable route selecting means, means effective when the contacts at the ends of said alternate routes are operated and said selecting means is also operated to energize the route circuit for the secondary route only, and means controlled by each route circuit when energized to operate one or more of the track switches as required to establish the route and to clear the signal for that route.

47. In an interlocking system for railroads, a track layout including a plurality of track switches arranged to form a plurality of different traffic routes including two alternate routes between the same points at the ends of the track layout comprising a preferred route and a secondary route, a plurality of signals for governing traffic movements over said routes, a manually operable contact for each route end and at each end of the layout, a route circuit for each route, means responsive to the joint operation of the contacts for the opposite ends of a route to energize the route circuit for that route, said means being normally effective in the case of said alternative routes to energize the route circuit for the preferred route only, and in case the preferred route is occupied by a train when the secondary route is available to energize the route circuit for the secondary route only, and means controlled by each route circuit when energized to operate one or more of the track switches as required to establish the route and to clear the signal for that route.

48. In an interlocking system for railroad track layouts providing a plurality of routes between signal locations over power operated track switches, a miniature track diagram of said track layout, indicators on said track diagram adjacent the switch points represented thereon, manually operable buttons on said diagram adjacent the represented signal locations, route establishing means responsive to the joint actuation of the two buttons alone belonging to the signal locations at the ends of a desired route for setting up said route for train movement thereover, a plurality of detector track sections for each route and associated track relays, a plurality of directional stick relays, two for each track section, an organization of circuits for controlling said directional stick relays and effective whenever a route is set up for either direction of train movement to operate one of said stick relays belonging to each of the detector track sections in that route for the corresponding direction of train movement, means governed by the track relay for each section in such route to maintain operated the directional stick relay for that track section while occupied by a train and those in advance thereof independently of the condition of said route establishing means, lighting circuits for said indicators governed by said directional stick relays and acting when any given route is established to illuminate the indicators in that route and maintain illuminated the indicators for track sections occupied by a train or in advance thereof independently of the condition of said route establishing means.

49. In combination, a track layout including a plurality of track switches, a route relay for each of a plurality of routes through said layout, means controlled by each route relay when energized to operate the track switches as required to establish the corresponding route, a switch locking relay for each switch energized only under conditions favorable for operation of the switch, and means preventing the energization of the route relay for a route when a locking relay for a switch of that route is deenergized and the position of said switch is not in accordance with the route.

50. In an interlocking control system, a track layout comprising a plurality of track sections interconnected by track switches to form different traffic routes, a track relay for each track section, a miniature track diagram of said track layout having lamps for illuminating portions thereof, route control means for each route effective when energized to operate the track switches as required to establish such route, a directional stick relay for each direction for each track section, means effective when a route is fully established for releasing selected ones of said stick relays for one direction including one relay for each section of such route, means controlled by a front contact of each track relay and by contacts of the directional relays for the same section for controlling the lighting of said lamps to indicate an established route on the track diagram, means controlled by a contact of each track relay for lighting a lamp to illuminate a portion of the track diagram to indicate the presence of a train in the corresponding track section, and means responsive to the movement of a train over such route to reenergize the stick relays for the route as such sections are vacated.

51. In a switch and signal control system of the entrance-exit type, a track layout including a traffic route including one or more power-operated switches and having a main signal and a call-on signal at one entrance end, a miniature track diagram of said track layout, manually operable buttons for designating the entrance and exit ends of said route, said buttons being independently operable and located respectively at points on said track diagram corresponding with the entrance and exit ends of said route, route establishing means responsive to the actuation of said buttons for the exit and entrance ends of said route for operating said track switches to the position required to establish said route and clear said main signal only if said route is not occupied by a train, and means responsive to an additional manipulation of the same button which controls the clearing of said main signal for controlling the clearing of said call-on signal when said route is occupied.

52. In a switch and signal control system of the entrance-exit type, a track layout including a traffic route including one or more power-operated switches and having a main signal and a call-on signal at one entrance end, a miniature track diagram of said track layout, manually operable buttons for designating the entrance and exit ends of said route, said buttons being independently operable and located respectively at points on said track diagram corresponding with the entrance and exit ends of said route, a clearing circuit for said main signal and a clearing circuit for said call-on signal each controlled in accordance with the position of said switches in said route, said clearing circuit for said main signal also includes contacts opened by the presence of a train in said route, route establishing means responsive to the actuation of said buttons to designate the entrance and exit ends of said route for operating said track switches to establish said route, and relay means responsive to different manipulations of the same button for controlling the clearing circuits of said main signal and said call-on signal respectively.

53. In an interlocking control system, a track layout comprising a plurality of track sections containing track switches adapted to be interconnected to form different traffic routes, a track relay for each section, a miniature track diagram of said track layout having lamps for illuminating portions thereof, route control means for each route effective when energized to operate the track switches as required to establish such route, a section locking relay for each direction for each track section each effective when deenergized to prevent the operation of the track switch in such section, means effective when a route is established for releasing selected ones of said relays for one direction including one for each section of said route, means effective as long as one section locking relay or the other for such section is deenergized for controlling the lighting of said lamps to indicate the established route on the track diagram, and means responsive to the movement of a train over such section of a route to reenergize the locking relay for such section.

54. In a switch and signal control system, a track layout comprising a plurality of track sections containing track switches adapted to be interconnected to form different traffic routes, a track relay for each section, a miniature track diagram of said track layout having lamps associated with said track sections, manually operable buttons for designating the entrance and exit ends of routes, route control means responsive to the actuation of buttons to designate entrance and exit ends of a route for controlling the track switches as requiring to establish said route and for lighting lamps of the track sections included in that route, a section locking relay for each direction for each track section each effective when deenergized to prevent the operation of the track switch in such section, means effective when a route is established for releasing selected ones of said relays for one direction including one for each section of said route, means effective so long as one section locking relay or the other for a section is deenergized for lighting the corresponding lamp, and means responsive to the movement of a train over each section of a route to re-energize the section locking relay for such section.

55. In an interlocking control system, a track layout including a plurality of track switches adapted to be arranged to form different traffic routes including two alternative routes between the same route ends, a route button for each route end, an electroresponsive route selector for each route, means responsive to the operation of each button for permitting energization of the selector for each route having one end marked by such button, said means being normally effective when a button at the end of said alternative routes is operated to permit the energization of the selector for but one of said alternative routes at a time, means responsive to the subsequent operation of the button for the other end of a selected route for rendering ineffective all of said selectors except the one for the selected route and for operating the track switches as required for the route, and selecting means automatically effective in the event a portion of said one alternative route is occupied by a train when the other is available to prevent the energization of the selector for said one alternative route to thereby permit the energization of the selector for the other in response to the operation of the button at one end of said routes.

56. In an interlocking control system, a track layout including a plurality of track switches which may be arranged to form different traffic routes, signals at the ends of said routes for governing the movement of traffic over said routes, including a high speed signal and a slow speed signal at one route end, a control lever and a push button for each route end, an entrance relay for each signal, an exit relay for each route end, means for clearing each signal except said slow speed signal when the control lever for the same route end is moved to a given operative position and the push button at the exit end of a route which such signal governs is operated, and means for clearing said slow speed signal when the control lever at the same route end is moved to a different operative position and the push button at the exit end of a route which such signal governs is operated.

57. In combination, a track layout including a plurality of track switches, a locking relay for each switch effective when deenergized to prevent operation of the switch, a manually operable contact for each track at each end of the layout, a route circuit for each traffic route through the track layout including relay means which when energized is effective to operate each switch of the route to a position in accordance with that route, means including the manually operable contacts for the two ends of each route for energizing the corresponding route circuit, means preventing the energization of a route circuit when such two contacts are closed unless each locking relay for a switch of the route is energized or the switch which such locking relay controls is already in the proper position to establish said route, and means for deenergizing the locking relay for each switch of a route when such route is fully established.

58. In combination, a track layout including a plurality of track sections containing track switches for arranging different traffic routes, a track diagram arranged to represent said layout, a plurality of route indication lamps and a single track indication lamp mounted in the tracks of each track section of said diagram, a track relay for each track section, a section locking relay for each direction for each section, means preventing the operation of each track switch when the track relay or either section locking relay for the corresponding section is deenergized, circuits for selectively controlling said section locking relays in accordance with the positions of the track switches to provide two series of normally energized tandem connected relays, one series for each direction, for each route, means for deenergizing the relays of each series when such route is established in the corresponding direction, means for subsequently reenergizing each relay of such series when the corresponding track section is vacated by a train moving over the established route, means effective as long as each section locking relay is deenergized for lighting said plurality of lamps for the corresponding section on the track diagram, and means controlled by each track relay when deenergized for lighting the track indication lamp for the corresponding section.

59. In an interlocking system for railroads, a plurality of routes through a track layout with certain of such routes being non-conflicting, a signal at the entrance of each route, an entrance button for the entrance end of a route, an exit button for the exit end of a route, means responsive to the joint operation of the entrance button and the exit button for a particular route to operate all the track switches required to set up that route, said means also at the same time operating some other switch not involved in the route thus set up to a reverse position to divert train movement away from said route set up and thereby provide derail protection, and means responsive to said joint operation of said entrance and exit buttons for said particular route to clear said signal for that route after such route has been mechanically set up.

60. In a system for controlling the operation of track switches and signals of a railway track layout by the operation of entrance and exit buttons associated with the entering and exit ends of the various routes over said track switches, a plurality of route circuits each individually appertaining to a particular route and closed only by joint manual actuation of the buttons at the entrance and exit ends of said route, means responsive to the energization of a given route circuit for closing a contact for the normal or the reverse position of each of the track switches in that route to govern the operation of said switches to positions required for that route, a normally inactive three-position stay-where-put auxiliary switch control lever for each of the track switches, circuit means associated with each auxiliary switch control lever for also closing said contacts for governing the normal and reverse operation of its switch only when said contacts are not controlled by said route circuits, switch position detecting means including contacts closed in accordance with the existing position of each track switch, a signal control circuit for controlling the clearing of a signal for a given route including the contacts operated by the route circuit for that route and contacts operated by the switch position detecting means of the switches of that route, said circuit being closed only if such contacts for all of said switches are in corresponding positions, and acting when closed to deenergize the lock relays for all of the switches in the route, a lock relay for each switch, and means for clearing each signal governed by the corresponding signal control circuit and effective only if the lock relays for the switches in the route are deenergized.

61. In an interlocking system of the entrance-exit type, a stretch of trackway including at least one track switch, a high speed signal and a call-on signal for governing traffic over said stretch of track, a miniature track diagram of said trackway, manually operable entrance and exit control buttons located on said track diagram at points corresponding with the opposite ends of said stretch of track, said entrance button having at least two distinctive operated positions, electro-responsive means controlled by the joint operation of said entrance button in either of its operated positions and the exit button for governing the position of the track switch in said stretch, and also acting in accordance with the distinctive operated position of the entrance button to selectively clear said high speed signal or said call-on signal.

SEDGWICK N. WIGHT.